(12) United States Patent
Ganser

(10) Patent No.: US 12,314,255 B2
(45) Date of Patent: May 27, 2025

(54) BULK ASSOCIATING VALUES WITH DATA RECORDS

(71) Applicant: Procore Technologies, Inc., Carpinteria, CA (US)

(72) Inventor: William Gabriel Ganser, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 18/483,410

(22) Filed: Oct. 9, 2023

(65) Prior Publication Data

US 2024/0111760 A1    Apr. 4, 2024

Related U.S. Application Data

(63) Continuation of application No. 18/151,796, filed on Jan. 9, 2023, now Pat. No. 11,782,909, which is a continuation of application No. 17/064,306, filed on Oct. 6, 2020, now Pat. No. 11,550,779.

(51) Int. Cl.
| | |
|---|---|
| *G06F 3/048* | (2013.01) |
| *G06F 3/04842* | (2022.01) |
| *G06F 16/23* | (2019.01) |
| *G06Q 10/10* | (2023.01) |

(Continued)

(52) U.S. Cl.
CPC ...... *G06F 16/2386* (2019.01); *G06F 3/04842* (2013.01); *G06Q 10/103* (2013.01); *G06Q 10/105* (2013.01); *G06Q 50/08* (2013.01)

(58) Field of Classification Search
CPC ............ G06F 16/2386; G06F 3/04842; G06Q 10/103; G06Q 10/105; G06Q 50/08
See application file for complete search history.

(56) References Cited

U.S. PATENT DOCUMENTS

| | | |
|---|---|---|
| 9,594,540 B1 | 3/2017 | Stasior et al. |
| 9,996,241 B2 | 6/2018 | Kikin-Gil et al. |
| 10,089,675 B1 | 10/2018 | Rastogi et al. |

(Continued)

OTHER PUBLICATIONS

International Searching Authority, International Search Report and Written Opinion, PCT International Application No. PCT/US2021/053748, Jan. 19, 2022, 9 pages.

(Continued)

*Primary Examiner* — David Phantana-angkool
(74) *Attorney, Agent, or Firm* — Lee Sullivan Shea & Smith LLP

(57) ABSTRACT

A computing platform configured to (i) receive, via a user interface, a command to activate a bulk association mode for bulk associating an attribute value with one or more line items, (ii) based on the command, activate the bulk association mode and thereby display, via the user interface, a bulk association view comprising a target region for receiving an indication of one or more line items that are to be bulk associated with one or more given attribute values, (iii) receive first user input selecting at least two given attribute values for bulk association, (iv) receive second user input indicating one or more given line items that are to be bulk associated with the two given attribute values, and (v) after receiving the second user input, cause each given line item to be associated with the two given attribute values.

20 Claims, 13 Drawing Sheets

(51) Int. Cl.
*G06Q 10/105* (2023.01)
*G06Q 50/08* (2012.01)

(56) References Cited

U.S. PATENT DOCUMENTS

| | | | |
|---|---|---|---|
| 10,127,595 | B1 | 11/2018 | Hipschman et al. |
| 10,803,507 | B1 | 10/2020 | Verma et al. |
| 11,226,977 | B1 | 1/2022 | Burke et al. |
| 11,500,955 | B2 * | 11/2022 | Borden ............... G06F 16/9535 |
| 2016/0291807 | A1 | 10/2016 | Chong et al. |
| 2018/0300349 | A1 | 10/2018 | Munk et al. |
| 2018/0341655 | A1 | 11/2018 | Abrahams et al. |
| 2020/0159741 | A1 | 5/2020 | Carasso et al. |
| 2021/0021614 | A1 | 1/2021 | Shahbaz et al. |
| 2021/0200780 | A1 | 7/2021 | Puvvada et al. |
| 2021/0357362 | A1 | 11/2021 | Munk et al. |
| 2022/0107940 | A1 | 4/2022 | Ganser |
| 2022/0229808 | A1 | 7/2022 | Miller |
| 2022/0253450 | A1 | 8/2022 | Bartels et al. |
| 2022/0335103 | A1 | 10/2022 | Borden |
| 2022/0365932 | A1 | 11/2022 | Marquardt et al. |
| 2023/0147870 | A1 * | 5/2023 | Borden ............... G06F 16/9535 707/723 |
| 2024/0039905 | A1 * | 2/2024 | Talavera ............... G06F 16/248 |
| 2024/0111760 | A1 * | 4/2024 | Ganser .................. G06F 3/0482 |
| 2024/0119101 | A1 * | 4/2024 | Borden ................. G06F 16/235 |
| 2024/0220324 | A1 * | 7/2024 | Talavera ............... G06Q 10/10 |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

BULK ASSOCIATING VALUES WITH DATA RECORDS

CROSS-REFERENCE TO RELATED APPLICATIONS

This application claims priority under 35 U.S.C. § 120 to, and is a continuation of, U.S. application Ser. No. 18/151,796, filed on Jan. 9, 2023, and entitled "Computer System and Method for Bulk Associating Attribute Values with Data Records," which is a continuation of U.S. application Ser. No. 17/064,306, filed on Oct. 6, 2020, issued as U.S. Pat. No. 11,550,779, and entitled "Computer System and Method for Bulk Associating Attribute Values with Data Records," the contents of each of which are incorporated herein by reference in their entirety.

BACKGROUND

Software applications are used on a regular basis to perform and manage tasks in users' personal and professional capacities. As some examples, software applications may assist users with managing tasks related to email communications, customer relationship management, billing and payroll processing, human resources management, and construction management. Many other types of software applications exist.

Software applications handle a large volume of data and can be complex. It is therefore desirable for software applications to provide sophisticated features and tools which can enhance a user's ability to interact with the software application and the overall user experience. Thus, any tool that can improve a user's interaction with a software application is desired.

OVERVIEW

Software applications provide users with the capability to perform and/or manage various tasks related to a wide range of user needs. As such, software applications are relied upon heavily by users to manage tasks on a regular basis. Such tasks may relate to both personal and professional aspects and may range from routine tasks, such as managing a contact list, handling email communications, or tracking budget information, to more complex tasks such as managing patient information for a healthcare provider, managing employee payroll for a company, or managing student enrollment for a university.

Many software applications provide the ability to perform and/or a manage a multitude of tasks and a combination of those tasks. For example, a human resources management software application may provide users with the ability to manage tasks related to human resources, such as managing an employee directory, updating employee information, and handling employee paycheck distribution, among other possibilities. As another example, a construction management software application (such as the one offered by Procore Technologies, Inc., who is the assignee of the present application) may provide users with the ability to manage tasks related to construction, such as creating new construction projects, uploading documentation (blueprints, contracts, etc.) related to a construction project, handling bids for various phases of a construction project, managing invoices related to a construction project, among various other possibilities.

One action routinely performed as part of managing a given task by users of a given software application is editing data records. In general, a data record is a collection of one or more attributes and/or attribute values. Data records, and their corresponding attributes and attribute values, may take various forms based on the type of software application being used and the type of task being performed. For example, when updating employee information in a human resources software application, data records that may be edited by a user may take the form of employee names, employee addresses, employee social security numbers, and the like. As another example, when handling bids for a construction project in a construction management software application, data records that may be edited by a user may take the form of project names, project locations, project tasks, names of bidders, and the like.

Often, a user may need to edit multiple data records in a similar way. For instance, a user may desire to edit multiple data records with a given attribute value. In order to do this, the user would need to select each data record individually and then perform the desired edit for the selected data record. This can be challenging when editing a large number of data records, as the user is required to repeatedly perform the same iteration of selecting and editing (e.g. associating with a given attribute value) each data record individually. For example, a user of the construction management software application described above may need to edit 50 recently completed tasks for a given construction project with a status indicating that each task is "complete." To edit the status of the 50 tasks, the user would need to select each task and then edit the status for that task, one at a time, performing the same editing action 50 times to complete the status update for all 50 tasks. This process can be tedious and time-consuming, leading to a subpar user experience.

In an effort to alleviate this problem, many software applications have begun to provide a capability for users to be able to edit more than one data record collectively. This capability allows users to define a set of data records by selecting multiple data records that need to be edited in a similar way, and then selecting an option to apply a desired edit collectively to the defined set of data records. This capability is often referred to as "bulk editing," as it allows users to select a "bulk" of data records on which to perform a single type of edit. For example, in the construction management scenario described above, the user may be able to use a bulk editing tool offered by the construction management software application to individually select the 50 tasks requiring a status update in order to define a single set of tasks to bulk edit, then select the desired edit of a "complete" status, and then apply the edit collectively to the entire set of 50 tasks. While this type of bulk editing capability provides some benefits over individual editing, existing bulk editing tools have limitations that still prove burdensome.

First, existing bulk editing tools do not allow a user to begin the bulk editing process from the perspective of the desired attribute value (e.g., the specific editing action that needs to be applied) that is to be applied to multiple data records. Instead, existing bulk editing tools require a user to first select all of the data records to be bulk edited, as described above. As a result, if the user determines, after completing the selection of the multiple data records and beginning the process of bulk editing by selecting the desired attribute value to be applied, that additional data records need to be edited in the same way, the user must either (i) restart the data record selection process to include the additional data records in the current set of data records to be bulk edited with the desired attribute value or (ii) complete the bulk edit for the selected data records, and then again begin a new bulk editing process to select a new set of data records comprising the additional data records, and then bulk edit the new set of data records with the desired attribute value. Similarly, if the user determines, after completing the selection of multiple data records and beginning the process of bulk editing by selecting the desired attribute value to be applied, that some of the selected data records in fact do not require the desired attribute value to be applied, the user must either (i) restart the data record selection process to remove those data records which do not require the desired attribute value or (ii) complete the bulk edit for the selected data records, and then begin a new bulk editing process to select a new set of data records comprising those data records which did not require the desired attribute value, and then bulk edit the new set of data records to remove the desired attribute value. In other words, existing bulk editing tools do not allow a user to shift the focus between the desired editing action to be applied and the data records that have been selected for bulk editing. As described above, this limitation can prove impractical.

Second, existing bulk editing tools typically allow a set of data records to be bulk edited with respect to only one attribute value at a time. As a result, if multiple data records are to be bulk edited in the same way with multiple attribute values, existing bulk editing tools require a user to perform a new iteration of the bulk editing process for each attribute value that is to be applied to the data records. For example, in the construction management scenario described above, the 50 tasks may require a status update of "complete" and an invoice update of "invoice sent." Existing bulk editing tools allow the user to bulk edit the 50 tasks with only one attribute value at a time. As a result, the user would need to perform the process of individually selecting the 50 tasks for bulk editing and then applying the edit for each attribute value that is to be applied to the data records. For instance, the user would need to individually select the 50 tasks to define a set for bulk editing and then apply a first bulk edit to apply the "complete" status update for the set of 50 tasks. The user would then need to perform another bulk editing iteration by again individually selecting the 50 tasks to define a set for bulk editing and then applying a second bulk edit to apply the "invoice sent" invoice update for the set of 50 tasks.

To improve upon these and other limitations, disclosed herein is a new software tool that facilitates bulk association of one or more values of a given attribute with multiple data records, which may be referred to herein as a "bulk association tool." The disclosed bulk association tool may be incorporated into any software application that lends itself to bulk association of data records with a selected value of an attribute, examples of which may include the types of software applications discussed above (e.g., Procore Technologies' software application for construction management that facilitates creation and management of different types of data records including punch lists, invoices, bid packages, inspections, RFIs, etc.), as well as other types of software applications (e.g., software applications for creating and managing time entries, expense reports, user lists, etc.), among other possibilities.

Further, in practice, the software application in which the bulk association tool is incorporated could either take the form of either (i) a software as a service ("SaaS") application that comprises a front-end software component running on a user's client station and a back-end software component running on a back-end platform that is accessible to the user client station via a communication network such as the Internet or (ii) a native application that runs on a user's client station, among other possibilities.

According to one example embodiment in which the disclosed bulk association tool has been incorporated into a SaaS application, a user may begin by inputting a request into the user's client station to access the SaaS application that incorporates the disclosed bulk association tool.

In response to receiving the user's request, the back-end computing platform may cause the user's client station to present a graphic user interface ("GUI") through which the user may navigate to a view of the software application that displays a list of data records based on the type of bulk association operation that the user wishes to perform using the disclosed bulk association tool. Such data records may take various forms, as described above.

The data records for which the user wishes to perform a bulk association operation using the disclosed bulk association tool may be presented to the user as line items and may be arranged in various ways. As one possibility, the line items may be presented as a list of individual line items (e.g., an identifier, such as a textual value, for each line item). Alternatively, or additionally, the individual line items may be presented as a nested list, such as a category-based nested list. The line items may be arranged and presented in other ways as well. Additionally, the GUI view presenting the line items may also include an attribute display region indicating which attribute values, if any, have been associated with the line items. For example, if no attribute values have yet been associated with the line items, the attribute display region may take the form of a blank region. As another example, if a single attribute value has been associated with the line items, the attribute display region may take the form of a single-column view. As yet another example, if multiple attribute values have been associated with the line items, the attribute display region may take the form of a multi-column view. Other examples are also possible. Furthermore, while the attribute display region may be presented initially along with the line items, it is also possible that the attribute display region may alternatively be presented at a later time after the bulk association tool has been activated.

In addition to the line items, the GUI view presented by the client station may also include a given attribute and a set of one or more corresponding attribute values that may be selected for bulk association with the line items. Additionally, or alternatively, the GUI view may include an option for the user to add to the set of attribute values. The GUI view presented to the user may include, for each attribute value in the set of one or more attribute values, a respective visual representation of each attribute value that the user may select for bulk association of one or more of the line items with a given attribute value.

The visual representation of a given attribute value may take various forms. As one example, the visual representation may take the form of a textual label. For instance, the textual label may comprise a name of the attribute value, a shorthand code for the attribute value, or some other alphanumerical text that represents the attribute value. Other types of textual labels are also possible. As another example, the visual representation may take the form of an icon. For instance, the icon may comprise a logo or a picture representing the attribute value. The visual representation may take other forms as well. Additionally, the visual representation may comprise a combination of various forms including those described above.

Further, the visual representation of a given attribute value may be selectable in various ways. As one example, a textual label of the visual representation may be selectable.

As another example, an icon of the visual representation may be selectable. As yet another example, the visual representation may have a separate GUI button associated with the visual representation that may be selectable. As still another example, the visual representation may have a separate GUI menu associated with the visual representation that may be selectable. The visual representation may be selectable in other ways as well.

While presenting the GUI, the client station may receive a user request to activate the bulk association mode. In turn, the client station may send the request to activate the bulk association mode to the back-end computing platform. The user request to activate bulk association mode may comprise selecting a visual representation, as described above, of a given attribute value that the given user wishes to bulk associate with one or more of the line items.

In response to receiving the request to enter the bulk association mode, the back-end computing platform may cause the client station to activate the bulk association mode by presenting a GUI view that enables the user to perform a bulk association of one or more of the line items with the given attribute value. In general, presenting the bulk association view may involve displaying (i) a target region for facilitating the bulk association of one or more of the line items with the given attribute value and (ii) a visual indication that the given attribute value has been selected for bulk association.

In general, the target region may comprise a particular area within the GUI view (which may be visually represented by a set of borders) where the user can input selections of the one or more line items with which to bulk associate the given attribute value. The target region may be presented in various areas within the GUI view. As one possibility, the target region may be overlaid onto the attribute display region for the user to select the one or more line items to bulk associate with the given attribute value. The target region may be overlaid onto a different region of the GUI view as well.

Furthermore, the target region may additionally include one or more visual indicators and/or other interactive control elements. Such visual indicators that are shown in the GUI view presenting the target region may take various forms, including text, icons/logos, buttons, etc. As one example, the target region may include a visual indicator that serves to indicate that the user is currently operating in the bulk association mode. As another example, the target region may include a visual indicator that serves to indicate which attribute value is currently selected for bulk association. As yet another example, the target region may include an exit control element that may be used by the user to input a request to exit the bulk association mode. Such visual indicators and/or controls elements may optionally be displayed in a banner within the target region. The target region may also include other indicators, controls, and/or features and may be displayed in other ways.

The target region may enable the user to bulk associate the given attribute value with one or more line items using various types of user inputs. Preferably, the target region may enable user inputs that are efficient, intuitive, and require minimal effort and interaction. As one possibility, the target region may enable the user to associate the given attribute value using a mouse or trackpad input, such as a single mouse (or trackpad) click for each line item with which the given attribute value should be associated or a double mouse (or trackpad) click for each line item with which the given attribute value should be associated. As another possibility, the target region may enable the user to associate the given attribute value using a touch screen input, such as a single touch screen "tap" for each line item with which the given attribute value should be associated. As still another possibility, the target region may enable the user to associate the given attribute value using a keyboard input, which may involve a combination of one or more navigation keys (e.g., one or more arrow keys or a tab key) for navigating between line items and a selection key (e.g., a return key) for associating a currently-selected line item with the given attribute value (e.g., by default, the keyboard input option may begin at the first listed line item, and the user may navigate between line items by using the down arrow key and/or tab key and then pressing the return key to associate the currently-selected line item with the given attribute value).

Using the target region of the disclosed bulk association tool as described above, the user may bulk associate the given attribute value with one or more line items. For each line item that the user selects to associate with the given attribute value, the client station may update the GUI view to display, in the attribute display region, a visual indicator corresponding to the given attribute value that may include a name and/or logo that is representative of the given attribute value, which serves to indicate that the given line item has been associated with the given attribute value. The visual indicator corresponding to the given attribute value may also include a removal control element to disassociate the given attribute value from the given line item.

As a result of the user inputting the selection(s) of the one or more line items with which to associate the given attribute value, the client station may transmit an indication of the user's selection(s) to the back-end platform. This function may take various forms. As one possibility, for each line item that the user selects to associate with the given attribute value, the client station may transmit an indication of the user's selection to the back-end platform. As another possibility, the client station may compile the user selections inputted during the bulk association mode and then transmit an indication of the user's selections to the back-end platform after the user has exited the bulk association mode as described below. Upon receiving the indication of the user selection(s) from the client station, the back-end computing platform may update the respective data record for each line item that has been bulk associated with the given attribute value to include the given attribute value.

After completing the bulk association of the given attribute value with one or more line items, the user may input a request to exit the bulk association mode. The user may input the request to exit the bulk association mode in various ways. As one possibility, the user may input a request to exit the bulk association mode by selecting (e.g., via mouse/trackpad input, touch screen input, or keyboard input, etc.) the exit control element from the target region to close the bulk association view and exit the bulk association mode. As another possibility, the user may input a request to exit the bulk association mode by pressing a given keyboard key (e.g., the escape key). As yet another possibility, the user may input a request to exit the bulk association mode by toggling to a different attribute value (e.g., while the target region is still open, selecting a different attribute value from the set of attribute values for the given attribute). Other ways of inputting a request to exit the bulk association mode are also possible. As a result of receiving the user input request to exit the bulk association mode, the client station may send a request to the back-end computing platform to exit the bulk association mode. In turn, the back-end computing platform may cause the user's client station to present an updated GUI view indicating that the bulk association mode has been exited by discontinuing displaying (i) the target region and (ii) the visual indication of the given attribute selected for bulk association.

The disclosed bulk association tool may be used in the manner described above to bulk associate one or more of the line items with one or more additional values of the given attribute as well. Additionally, as described in further detail below, the disclosed bulk association tool may provide a user with the ability to bulk associate each of one or more displayed line items with multiple different values of an attribute via a single user input per line item. Examples of using the disclosed technology in these ways will be described in more detail below.

While the disclosed bulk association tool has been described above as being implemented by a SaaS application, it should be understood that the disclosed bulk association tool may be implemented by a native software application as well.

As described above, the disclosed bulk association tool improves upon existing technology by enabling a user to select one or more data records for bulk association based on first determining a given attribute value (e.g., a specific editing action) with which to perform the bulk association. Additionally, the disclosed bulk association tool improves upon existing technology by enabling a user to perform a bulk association of one or more line items with multiple different attribute values via a single user input per line item.

Accordingly, in one aspect, disclosed herein is a method that involves a computing platform (1) causing a client station to display, via a graphic user interface ("GUI"), (i) a set of line items and (ii) a set of one or more given attribute values for a given attribute that may be selected for bulk association with one or more of the line items, (2) receiving, from the client station, a request to activate a bulk association mode for bulk associating one or more of the line items with a given attribute value, (3) causing the client station to display, via the GUI, a bulk association view indicating that the bulk association mode has been activated, wherein the bulk association view comprises a target region for receiving user input comprising a selection of one or more of the line items to be bulk associated with the given attribute value, (4) receiving, from the client station, an indication that the user input has been received, and (5) based on the user input, updating each respective line item to be bulk associated with the given attribute value.

In another aspect, disclosed herein is a computing platform that includes a network interface, at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable storage medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As discussed above, disclosed herein is software technology that includes a bulk association tool for facilitating bulk association of one or more attribute values of a given attribute with multiple data records.

I. EXAMPLE NETWORK CONFIGURATION

As one possible implementation, this software technology may include both front-end client software running on one or more client stations that are accessible to client users of the software technology and back-end software running on a back-end platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end platform (e.g., a native software application). The software technology disclosed herein may take other forms as well.

Figure 1:
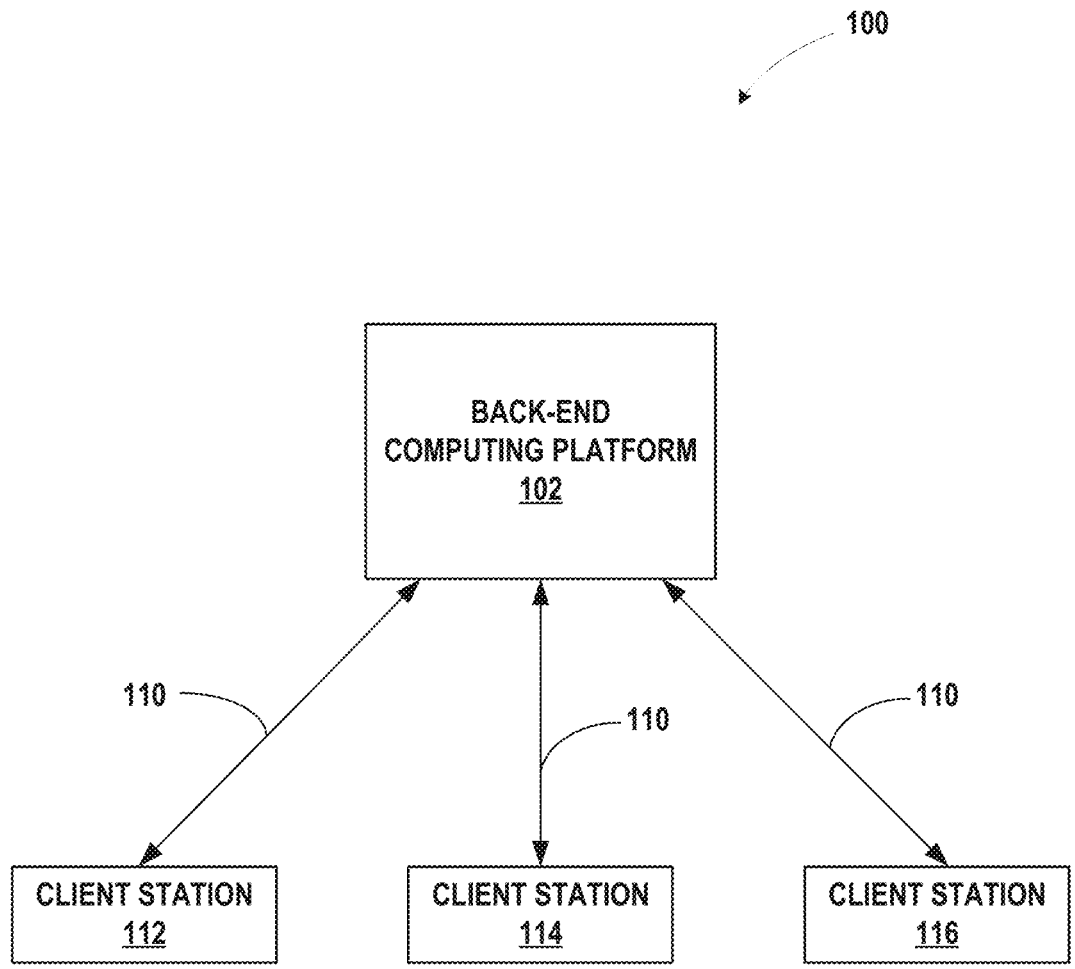
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as three client stations 112, 114, and 116.

In general, back-end computing platform 102 may comprise one or more computing systems that have been provisioned with software for carrying out one or more of the computing platform functions disclosed herein, including but not limited to functions related to outputting associated data and/or instructions that define the visual appearance of a front-end interface (e.g. a graphical user interface (GUI)) through which the data is to be presented on the one or more client stations, and updating data records with the bulk associations made using the disclosed software technology. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the computing platform functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the computing platform functions disclosed herein. Other implementations of back-end computing platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end computing platform 102 is configured to communicate with one or more client stations 112, 114, 116 over respective communication paths. Each communication path between back-end computing platform 102 and one of client stations 112, 114, 116 may generally comprise one or more communication networks and/or communications links, which may take any of various forms. For instance, each respective communication path with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end computing platform 102 may be wireless, wired, or some combination thereof, and may carry data according to any of various different communication protocols. Although not shown, the respective communication paths with back-end computing platform 102 may also include one or more intermediate systems. For example, it is possible that back-end computing platform 102 may communicate with a given client station 112, 114, 116 via one or more intermediary systems, such as a host server (not shown). Many other configurations are also possible.

Although not shown in FIG. 1, back-end computing platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
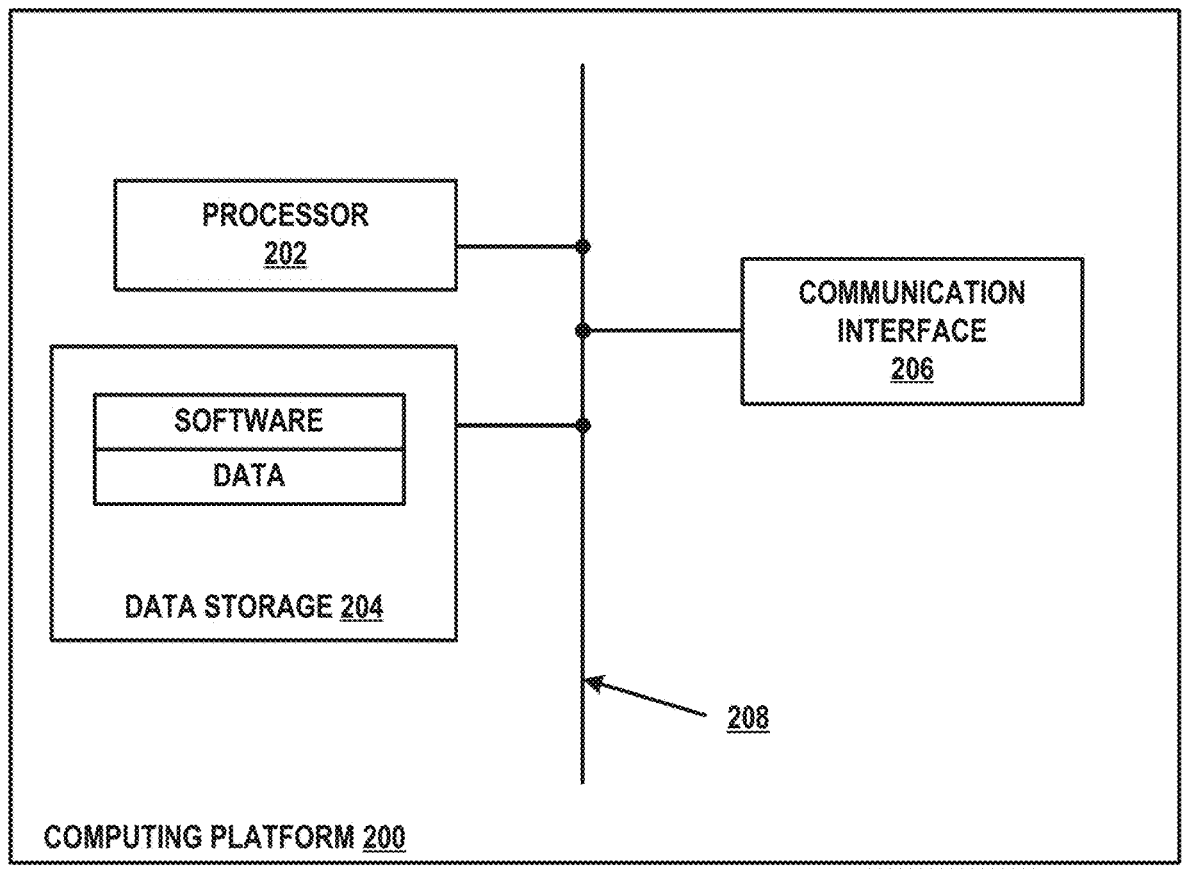
FIG. 2 depicts an example computing platform that may be configured to carry out one or more of the functions of the present disclosure.

FIG. 2 is a simplified block diagram illustrating some structural components that may be included in an example computing platform 200, which could serve as back-end computing platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that platform 200 is configured to perform some or all of the disclosed functions and (ii) data that may be received, derived, or otherwise stored, for example, in one or more databases, file systems, or the like, by platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication, among other possibilities. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE FUNCTIONALITY

As described above, the disclosed technology is generally directed to a new software tool that facilitates bulk association of one or more values of a given attribute with multiple data records, which may be referred to herein as a "bulk association tool." The disclosed bulk association tool may include various aspects and may take various forms. Some example functions for using the bulk association tool will now be described with reference to FIG. 3.

Figure 3:
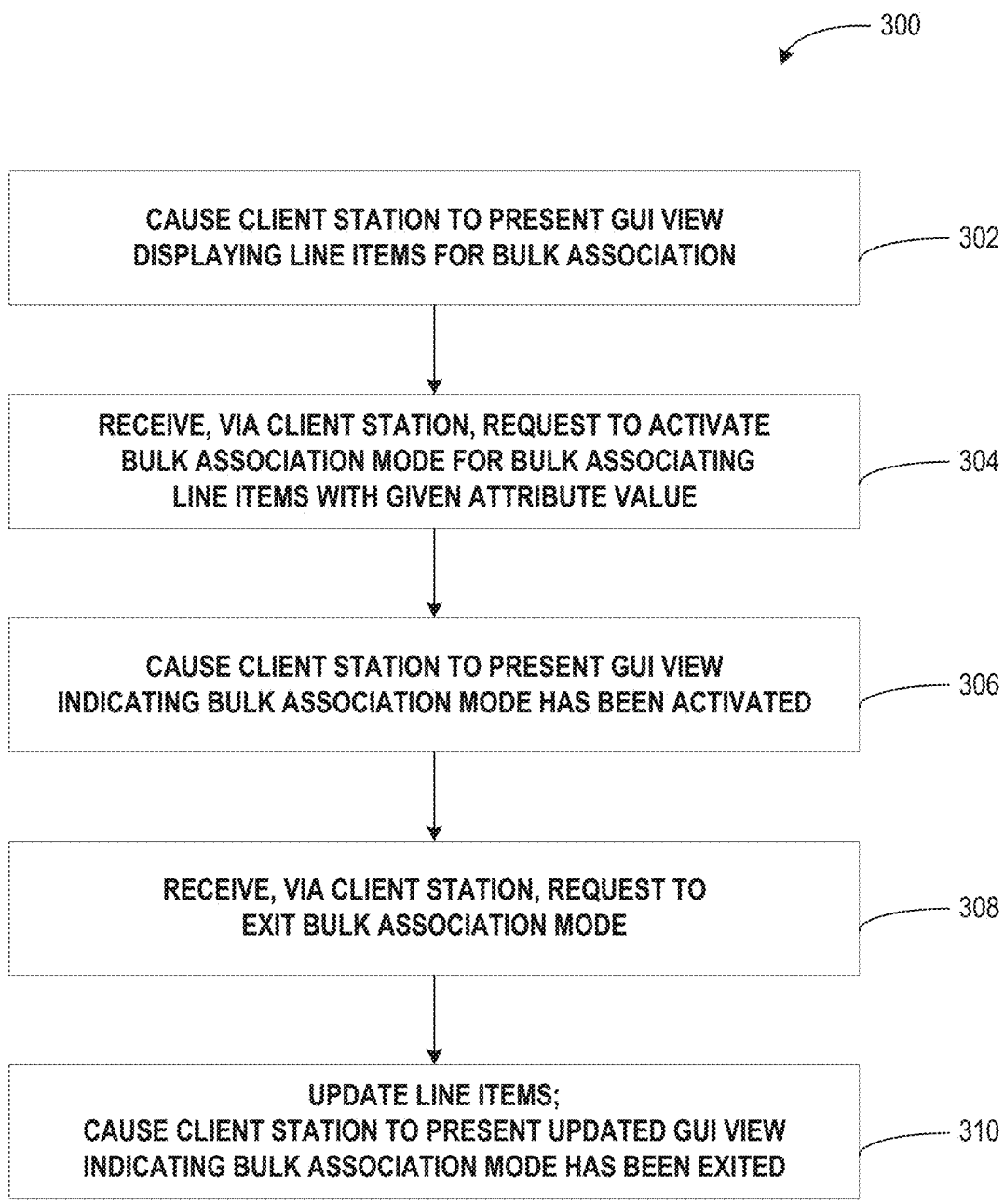
FIG. 3 depicts an example flow diagram for performing a bulk association using the disclosed software technology.

For the purposes of illustration only, the example functions are described as being carried out by a back-end computing platform (e.g., back-end computing platform 102). However, it is possible that the responsibility for carrying out the functions of the disclosed process may be distributed between a back-end platform (e.g., back-end computing platform 102) and one or more client stations (e.g., client stations 112, 114, and/or 116). Further, it should be understood that the flow diagram in FIG. 3 is merely described in such a manner for the sake of clarity and explanation and that some functions may be carried out in various other manners as well, including the possibility that example functions may be added, removed, rearranged into different orders, grouped together, and/or not grouped together at all.

In practice, the software application in which the bulk association tool is incorporated could either take the form of either (i) a SaaS application that comprises a front-end software component running on a user's client station and a back-end software component running on a back-end platform that is accessible to the user client station via a communication network such as the Internet (e.g., directing a web browser on the user's client station to a uniform resource locator (URL) for the software application) or (ii) a native application that runs on a user's client station, among other possibilities.

According to one example embodiment in which the disclosed bulk association tool has been incorporated into a SaaS application, a user may begin the process of accessing the disclosed bulk editing tool by inputting a request into the user's client station to access the SaaS application that incorporates the disclosed bulk association tool.

At block 302, in response to receiving the user's request, the back-end computing platform may cause the user's client station to present a GUI through which the user may navigate to a view of the software application that displays a list of data records based on the type of bulk association operation that the user wishes to perform using the disclosed bulk association tool. As described above, the data records that may be selected may take various forms depending on the type of software application being accessed by the user and the type of bulk association operation that the user wishes to perform.

Figure 4:
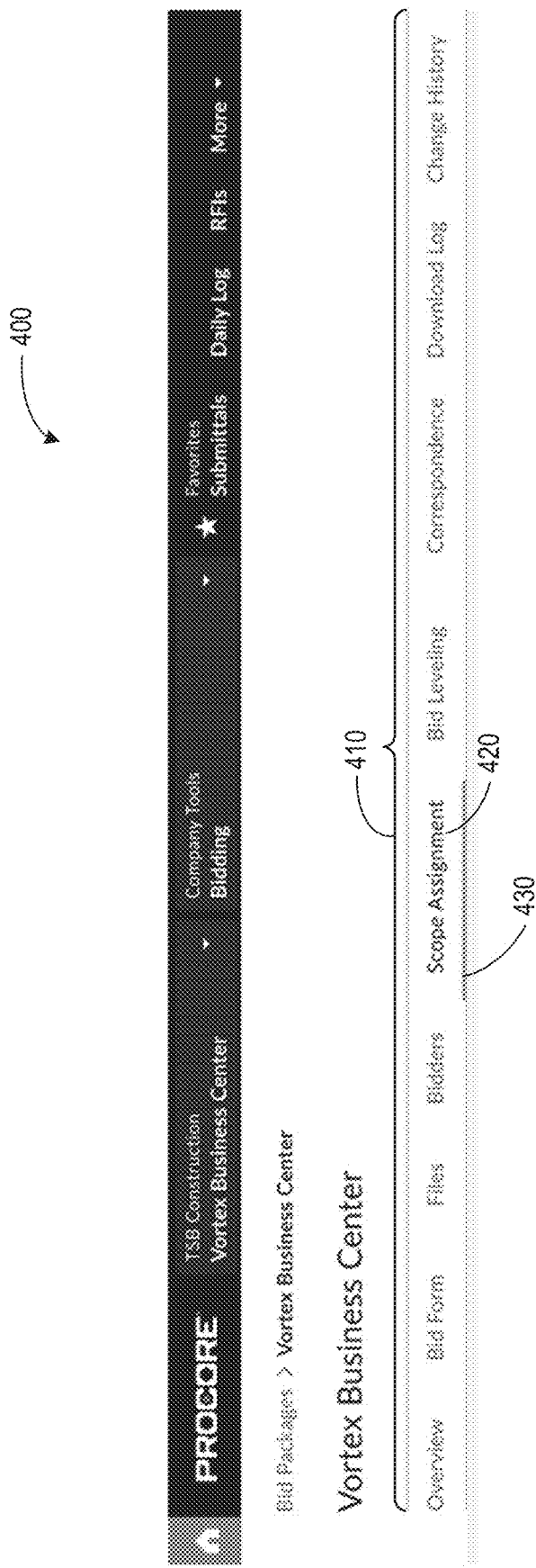
FIG. 4 depicts an example view of a GUI that may be presented to a user to select items for bulk association using the disclosed software technology.

As one example to illustrate, FIG. 4 depicts an example view 400 that may be presented to a construction professional who has accessed a construction management software application like the one described above (e.g., Procore Technologies' software application for construction management that facilitates creation and management of different types of data records including punch lists, invoices, bid packages, inspections, RFIs, etc.). The construction professional may desire to edit bidding information for a given construction project. In particular, the construction professional may desire to edit a bid package for the given construction project to associate bidders with specific tasks related to the given construction project in order to allow the bidders to submit bids for the given tasks with which they have been associated. As a result, based on navigating to "Bidding" information for a given project titled "Vortex Business Center," the construction professional may be presented with the view 400 displaying various types of data records related to "Bid Packages" for the "Vortex Business Center" construction project that may be selected for editing. As further shown in FIG. 4, the construction professional may select "Scope Assignment" 420, as indicated by a visual indicator 430, in order to request data records for "Scope Assignment."

Returning to FIG. 3 at block 302, the GUI view presented by the client station displaying the data records may take various forms. The data records for which the user wishes to perform a bulk association operation using the disclosed bulk association tool may be presented to the user as line items and may be arranged in various ways. As one possibility, the line items may be presented as a list of individual line items represented by a respective identifier, such as a textual value, for each line item. Alternatively, or additionally, the individual line items may be presented as a nested list, such as a category-based nested list. The line items may be arranged and presented in other ways as well. Additionally, the GUI view presenting the line items may also include an attribute display region indicating which attribute values, if any, have been associated with the line items. For example, if no attribute values have yet been associated with the line items, the attribute display region may take the form of a blank region. As another example, if a single attribute value has been associated with the line items, the attribute display region may take the form of a single-column view. As yet another example, if multiple attribute values have been associated with the line items, the attribute display region may take the form of a multi-column view. Other examples are also possible. Furthermore, while the attribute display region may be presented initially along with the line items, it is also possible that the attribute display region may be presented at a later time after the bulk association tool has been activated.

In addition to the line items, the GUI view presented by the client station may also include a given attribute and a set of one or more corresponding attribute values that may be selected for bulk association with the line items. Additionally, or alternatively, the GUI view may include an option for the user to add to the set of attribute values. The GUI view presented to the user may include, for each attribute value in the set of one or more attribute values, a respective visual representation of each attribute value that the user may select for bulk association of one or more of the line items with a given attribute value.

The visual representation of a given attribute value may take various forms. As one example, the visual representation may take the form of a textual label. For instance, the textual label may comprise a name of the attribute value, a shorthand code for the attribute value, or some other alphanumerical text that represents the attribute value. Other types of textual labels are also possible. As another example, the visual representation may take the form of an icon. For instance, the icon may comprise a logo or a picture representing the attribute value. The visual representation may take other forms as well. Additionally, the visual representation may comprise a combination of various forms including those described above.

Further, the visual representation of a given attribute value may be selectable in various ways to activate the bulk association mode and bulk associate the given attribute value with one or more line items. As one example, a textual label of the visual representation may be selectable. As another example, an icon of the visual representation may be selectable. As yet another example, the visual representation may have a separate GUI button associated with the visual representation that may be selectable. As still another example, the visual representation may have a separate GUI menu associated with the visual representation that may be selectable. The visual representation may be selectable in other ways as well.

Figure 5A:
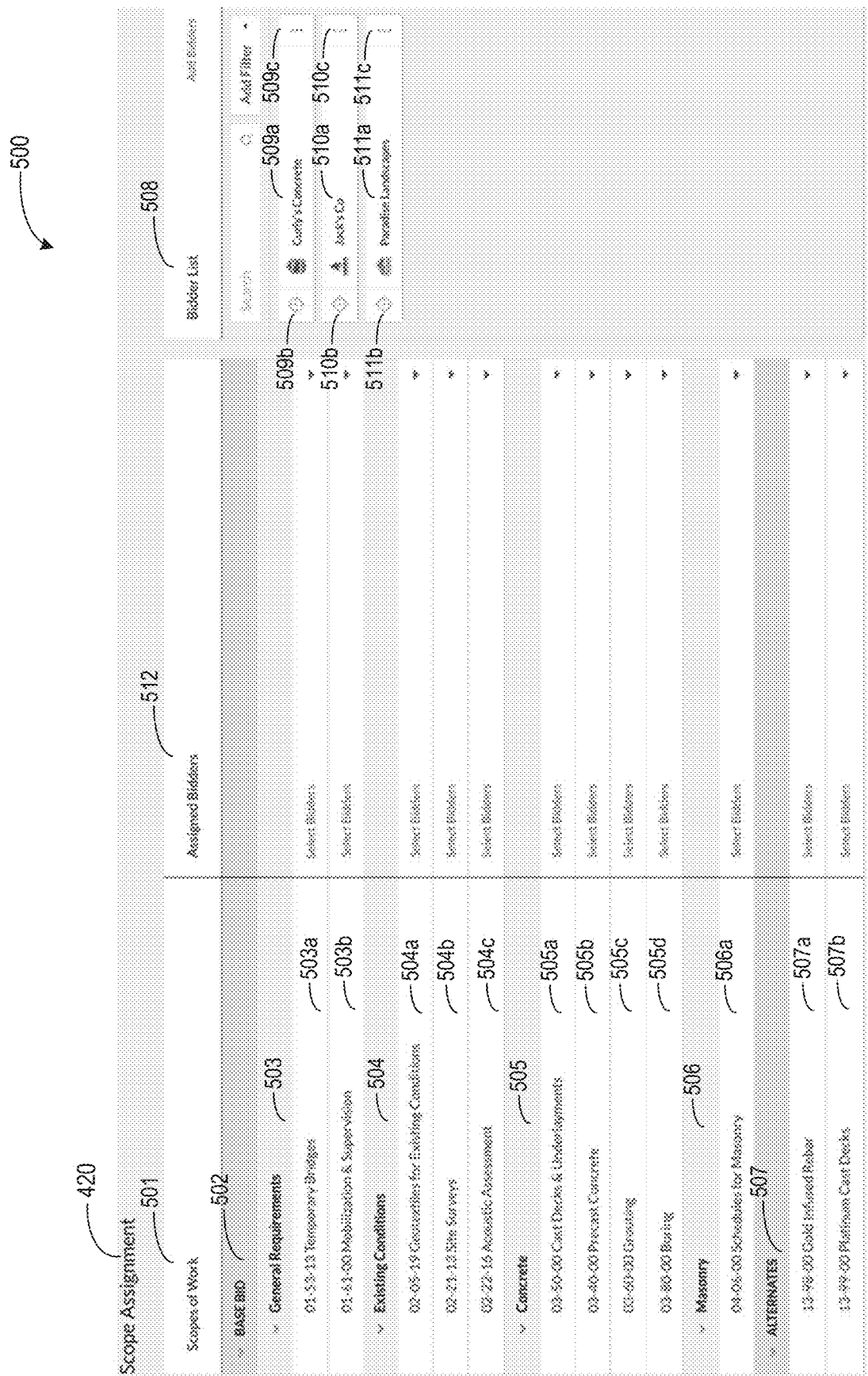
FIG. 5A depicts an example view of a GUI that may be presented to a user after items for bulk association have been selected.

To illustrate, FIG. 5A depicts an example view 500 that may be presented to the construction professional upon selecting "Scope Assignment" 420 in view 400 of FIG. 4. As shown in FIG. 5A, data records related to "Scope Assignment" 420 may be presented as line items arranged in a category-based nested list. Line items 503a-507b may be arranged under a "Scopes of Work" column 501. As shown, "Scopes of Work" column 501 lists a "Base Bid" category 502, which further lists nested sub-categories 503, 504, 505, and 506, listing line items 503a-b, 504a-c, 505a-d, and 506a, respectively, and an "Alternatives" category 507, which further lists line items 507a-b. Furthermore, the example view 500 includes an "Assigned Bidders" attribute display region 512 for displaying any attribute values that have been associated with the line items 503a-507b. As shown in view 500, no attribute values are displayed in attribute display region 512, indicating that no attribute values have yet been associated with any of line items 503a-507b.

Additionally, the example view 500 may display a "Bidder List" attribute 508 having a set of attribute values that may be selected for bulk association with one or more of the line items 503a-507b. The set of attribute values for the "Bidder List" attribute 508 includes visual representations of attribute values "Curly's Concrete" 509a, "Jack's Co" 510a, and "Paradise Landscape" 511a. As shown in view 500, the respective visual representation for each of the attribute values 509a, 510a, and 511a may take the form of a textual label and logo combination comprising the name and logo of each attribute value. The visual representations for each of the attribute values may also include separate, selectable GUI buttons 509b, 510b, 511b, associated with attribute values 509a, 510a, and 511a, respectively. Further, the visual representations for each of the attribute values may include separate, selectable GUI menus 509c, 510c, and 511c, associated with attribute values 509a, 510a, and 511a, respectively. The selectable GUI buttons 509b, 510b, 511b, and selectable GUI menus 509c, 510c, and 511c, may allow the construction professional to take certain actions with respect to a given attribute value. Such actions may include, for example, activating the bulk association mode to associate the given attribute value with line items 503a-507b. Furthermore, the view 500 may display an option to "Add Bidders" for the construction professional to add attribute values to the set of attribute values for the "Bidder List" attribute.

Returning to FIG. 3, at block 304, while presenting the GUI, the client station may receive a user input request to activate the bulk association mode. The user input request to activate the bulk association mode may comprise selecting a visual representation, as described above, of a given attribute value that the user wishes to bulk associate with one or more line items. In turn, the client station may send a request to activate the bulk association mode to the back-end computing platform.

At block 306, in response to receiving the request to activate the bulk association mode, the back-end computing platform may cause the client station to activate the bulk association mode by presenting a bulk association GUI view that enables the user to perform a bulk association of one or more line items with the given attribute value. In general, displaying the bulk association view may involve displaying (i) a target region for facilitating the bulk association of one or more line items with the given attribute value and (ii) a visual indication that the given attribute value has been selected for bulk association.

In general, the target region may comprise a particular area within the GUI view (which may be visually represented by a set of borders) where the user can input selections of the one or more line items with which to bulk associate the given attribute value. The target region may be presented in various areas within the GUI view. As one possibility, the target region may be overlaid onto the attribute display region for the user to select one or more line items to bulk associate with the given attribute value. The target region may be overlaid onto a different region of the GUI view as well.

Furthermore, the target region may additionally include one or more visual indicators and/or other interactive control elements. Such visual indicators that are shown in the GUI view presenting the target region may take various forms, including text, icons/logos, buttons, etc. As one example, the target region may include a visual indicator which serves to indicate that the user is currently operating in the bulk association mode. As another example, the target region may additionally include a visual indicator which serves to indicate which attribute value is currently selected for bulk association. As yet another example, the target region may additionally include an exit control element that may be used by the user to input a request to exit the bulk association mode. Such visual indicators and/or controls elements may optionally be displayed in a banner within the target region. The target region may also include other indicators, controls, and/or features and may be displayed in other ways as well.

The target region may enable the user to bulk associate the given attribute value with one or more line items using various types of user inputs. Preferably, the target region may enable user inputs that are efficient, intuitive, and require minimal effort and interaction. As one possibility, the target region may enable the user to associate the given attribute value using a mouse or trackpad input, such as a single mouse (or trackpad) click for each line item with which the given attribute value should be associated or a double mouse (or trackpad) click for each line item with which the given attribute value should be associated. As another possibility, the target region may enable the user to associate the given attribute value using a touch screen input, such as a single touch screen "tap" for each line item with which the given attribute value should be associated. As still another possibility, the target region may enable the user to associate the given attribute value using keyboard input, which may involve a combination of one or more navigation keys (e.g., one or more arrow keys or a tab key) for navigating between line items and a selection key (e.g., a return key) for associating a currently-selected line item with the given attribute value (e.g., by default, the keyboard input option may begin at the first listed line item, and the user may navigate between line items by using the down arrow key and/or tab key and then pressing the return key to associate the currently-selected line item with the given attribute value).

Figure 5B:
FIG. 5B depicts an example modified view of a GUI that may be presented to a user to facilitate bulk association using the disclosed software technology.

To illustrate, FIG. 5B depicts a modified view 520 of view 500, which may be presented after the construction professional has input a user request to activate the bulk association mode by selecting a visual representation of a given attribute value as described above. The construction professional may have selected to associate the "Curly's Concrete" attribute value 509a with one or more of line items 503a-507b by selecting the GUI button 509b while being presented with the view 500 in FIG. 5A. View 520 depicts a bulk association view that includes a target region 521 and a visual indication that the "Curly's Concrete" attribute value 509a has been selected for bulk association. The visual indication may comprise highlighting the GUI button 509b as shown. Other visual indications are also possible. Although not shown, the bulk association view may include additional features as well, such as a cursor trailer comprising the logo for the currently-selected attribute value.

The target region 521 may comprise a particular selectable area 522 within the GUI view (which may be visually represented by a set of borders) where the user can input selections of the one or more line items with which to bulk associate the given attribute value. As shown in view 520, the target region 521 may take a rectangular form represented by a set of four visual borders. However, it is possible the target region may take the form of other shapes and may be represented by fewer or additional visual borders. As shown in view 520, the target region 521 may be overlaid onto the attribute display region 512 shown in view 500 of FIG. 5A.

Furthermore, the target region 521 may additionally include one or more visual indicators and/or other interactive control elements. Such visual indicators and/or interactive control elements may take various forms, including text, icons/logos, buttons, etc. For example, the target region 521 may include a visual indicator 523 that may take the form of a textual label which serves to indicate that the user is currently operating in the bulk association mode. The target region 521 may additionally include a visual indicator 524 that may take the form of an icon corresponding with the currently-selected attribute value (e.g., a logo of the currently-selected attribute value) which serves to indicate the attribute value that is currently selected for bulk association with the line items. The target region 521 may additionally include an exit control element 525 that may be used by the user to input a request to exit the bulk association mode. As shown, exit control element 525 may comprise a keyboard entry instruction for closing the target region 521 and exiting the bulk association mode. Additionally, or alternatively, exit control element 525 may be a selectable element that the construction professional can select (e.g., via mouse click) for closing the target region 521 and exiting the bulk association mode.

Certain visual indicators and/or interactive control elements of the target region 521 may be static and be presented in the same way each time the bulk association mode is activated, whereas other visual indicators and/or interactive control elements may be unique to an attribute value and may thus be dynamically updated depending on the attribute value that is selected for bulk association. For example, as shown in view 520, visual indicator 523 that serves to indicate that the user is currently operating in the bulk association mode and exit control element 525 that may be used by the user to input a request to exit the bulk association mode may be static visual indicators that are presented in the same way each time the bulk association mode is activated and the target region 521 is displayed. On the other hand, visual indicator 524 that serves to indicate the attribute value that is currently selected for bulk association may dynamically update to correspond with the logo of the currently-selected attribute value, which in view 520, is the "Curly's Concrete" attribute value 509a.

The additional visual indicators and/or interactive control elements of target region 521 may be presented in a banner positioned within the target region 521, such as at the head of target region 521, as shown in view 520. Alternatively, the banner may be displayed in a different position with respect to the target region 521, such as at the foot of target region 521, along the left or the right side of target region 521, or even detached from target region 521. The target region 521 may also include other indicators, controls, and/or features and may be displayed in other ways.

As described above, the target region 521 may enable the user to bulk associate one or more of the line items with the given attribute value using various types of user inputs. Preferably, the target region 521 may enable user inputs that are efficient, intuitive, and require minimal effort and interaction. As one possibility, the target region 521 may enable the construction professional to associate the given attribute value using a mouse or trackpad input, such as a single mouse (or trackpad) click for each line item with which the given attribute value should be associated or a double mouse (or trackpad) click for each line item with which the given attribute value should be associated. As another possibility, the target region 521 may enable the construction professional to associate the given attribute value using a touch screen input, such as a single touch screen "tap" for each line item with which the given attribute value should be associated. As still another possibility, the target region 521 may enable the construction professional to associate the given attribute value using keyboard input, which may involve a combination of one or more navigation keys (e.g., one or more arrow keys or a tab key) for navigating between line items and a selection key (e.g., a return key) for associating a currently-selected line item with the given attribute value (e.g., by default, the keyboard input option may begin at the first-listed line item, and the user may navigate between line items by using the down arrow key and/or tab key and then pressing the return key to associate the currently-selected line item with the given attribute value). The target region 521 may enable other types of inputs as well.

As shown in view 520 of FIG. 5B, target region 521 may receive, in the selectable area 522, user input from the construction professional to bulk associate the "Curly's Concrete" attribute value 509a with one or more of the line items 503a-507b. To facilitate receiving the user input, the target region 521 may display in the selectable area 522 a visual indicator when the construction professional's cursor hovers over a given line item to indicate that the given line item is currently selected for association with the attribute value 509a. As shown, such a visual indicator may comprise highlighting the section of the selectable area 522 that corresponds with the given line item that the construction professional wishes to bulk association with the given attribute value and displaying a "Click to assign" message to guide the construction professional in performing the bulk association. In this way, target region 521 may enable the construction professional to select from line items 503a-507b those line items which should be bulk associated with the "Curly's Concrete" attribute value 509a. In some implementations, in addition to being able to select line items individually, the construction professional may be able to select a category 503, 504, 505, and/or 506 to bulk associate, via a single user input, all of the line items within that category with the "Curly's Concrete" attribute value 509a. The target region 521 may enable the construction professional to perform the bulk association by using a mouse or trackpad to enter a single click for each of the line items 503a-507b that should be associated with the "Curly's Concrete" attribute value 509a. Using the target region 521 of the disclosed bulk association tool, the construction professional may proceed to bulk associate one or more of line items 503a-507b with the "Curly's Concrete" attribute value 509a.

As described above, the target region of the disclosed bulk association tool may enable the user to bulk associate the given attribute value with one or more line items. For each line item that the user selects to associate with the given attribute value, the client station may update the GUI view to display, in the attribute display region, a visual indicator corresponding to the given attribute value that may include a name and/or logo that is representative of the given attribute value, which serves to indicate that the given line item has been associated with the given attribute value. The visual indicator corresponding to the given attribute value may also include a removal control element to disassociate the given attribute value from the given line item.

For each line item that the "Curly's Concrete" attribute value 509a selects to associate with the given attribute value, the back-end computing platform may cause the GUI to display, in the attribute display region, a visual indicator corresponding to the given attribute value that may include the given attribute value's name and/or attribute value logo, indicating that the given line item has been associated with the given attribute value. The visual indicator corresponding to the given attribute value may also include a removal control element to disassociate the given attribute value from the given line item.

Figure 5C:
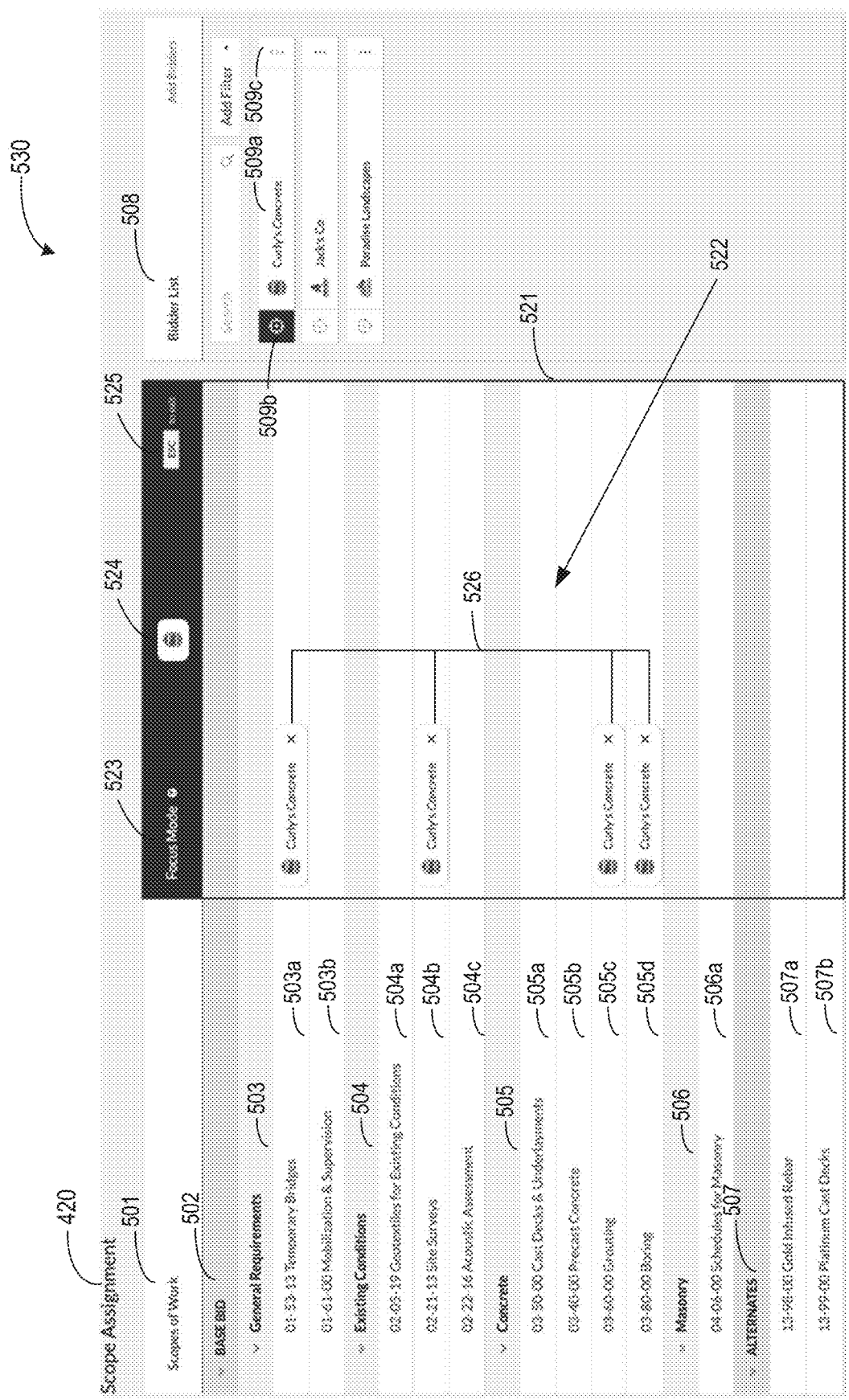
FIG. 5C depicts another example modified view of a GUI that may be presented to a user to facilitate bulk association using the disclosed software technology.

Turning to FIG. 5C, a modified view 530 of the view 520 is shown. In view 530, the construction professional has selected, using the target region 521, line items 503a, 504b, 505c, and 505d to be bulk associated with the attribute value 509a. Based on the construction professional's selections, the view 530 may show, in the attribute display region 512 over which the target region 521 is overlaid, a visual indicator 526 corresponding to the attribute value 509a for each of the line items 503a, 504b, 505c, and 505d. The visual indicator 526 may include the "Curly's Concrete" name of attribute value 509a, the logo of attribute value 509a, and a removal control element, denoted by an "X" icon, to disassociate the attribute value 509a from any of line items 503a, 504b, 505c, and 505d. After completing the bulk association of line items 503a-507b with the "Curly's Concrete" attribute value 509a, the construction professional may close the target region and exit the bulk association mode by selecting the ESC keyboard key, as indicated by exit control element 525.

As a result of the user inputting the selection(s) of the one or more line items with which to associate the given attribute value, the client station may transmit an indication of the user's selection(s) to the back-end platform. This function may take various forms. As one possibility, for each line item that the user selects to associate with the given attribute value, the client station may transmit an indication of the user's selection to the back-end platform as the selection is received. As another possibility, the client station may compile the user selections inputted during the bulk association mode and then transmit an indication of the user's selection(s) to the back-end platform after the user has exited the bulk association mode as described below. Upon receiving the indication of the user selection(s) from the client station, the back-end computing platform may update the respective data record for each line item that has been bulk associated with the given attribute value to include the given attribute value.

After completing the bulk association of the given attribute value with one or more line items, the user may input a request to exit the bulk association mode. The user may input the request to exit the bulk association mode in various ways. As one possibility, the user may input a request to exit the bulk association mode by selecting (e.g., via mouse/trackpad input, touch screen input, or keyboard input, etc.) the exit control element from the target region to close the bulk association view and exit the bulk association mode. As another possibility, the user may input a request to exit the bulk association mode by pressing a given keyboard key (e.g., the escape key). As yet another possibility, the user may input a request to exit the bulk association mode by toggling to a different attribute value (e.g., while the target region is still open, selecting a different attribute value from the set of attribute values for the given attribute). Other ways of inputting a request to exit the bulk association mode are also possible.

Returning to FIG. 3, at block 308, as a result of receiving the user input request to exit the bulk association mode, the client station may send a request to the back-end computing platform to exit the bulk association mode. In an implementation where the client station may compile the user selections inputted during the bulk association mode and then transmit an indication of the user's selection(s) to the back-end platform after the user has exited the bulk association mode, the client station may include with the request to exit the bulk association mode, an indication of the user's bulk association selection(s).

In turn, at block 310, the computing platform may update the respective data record for each line item that has been bulk associated with the given attribute value to include the given attribute value. The computing platform may additionally cause the client station to present an updated GUI view indicating that the bulk association mode has been exited by discontinuing displaying (i) the target region and (ii) the visual indication of the given attribute selected for bulk association.

Figure 5D:
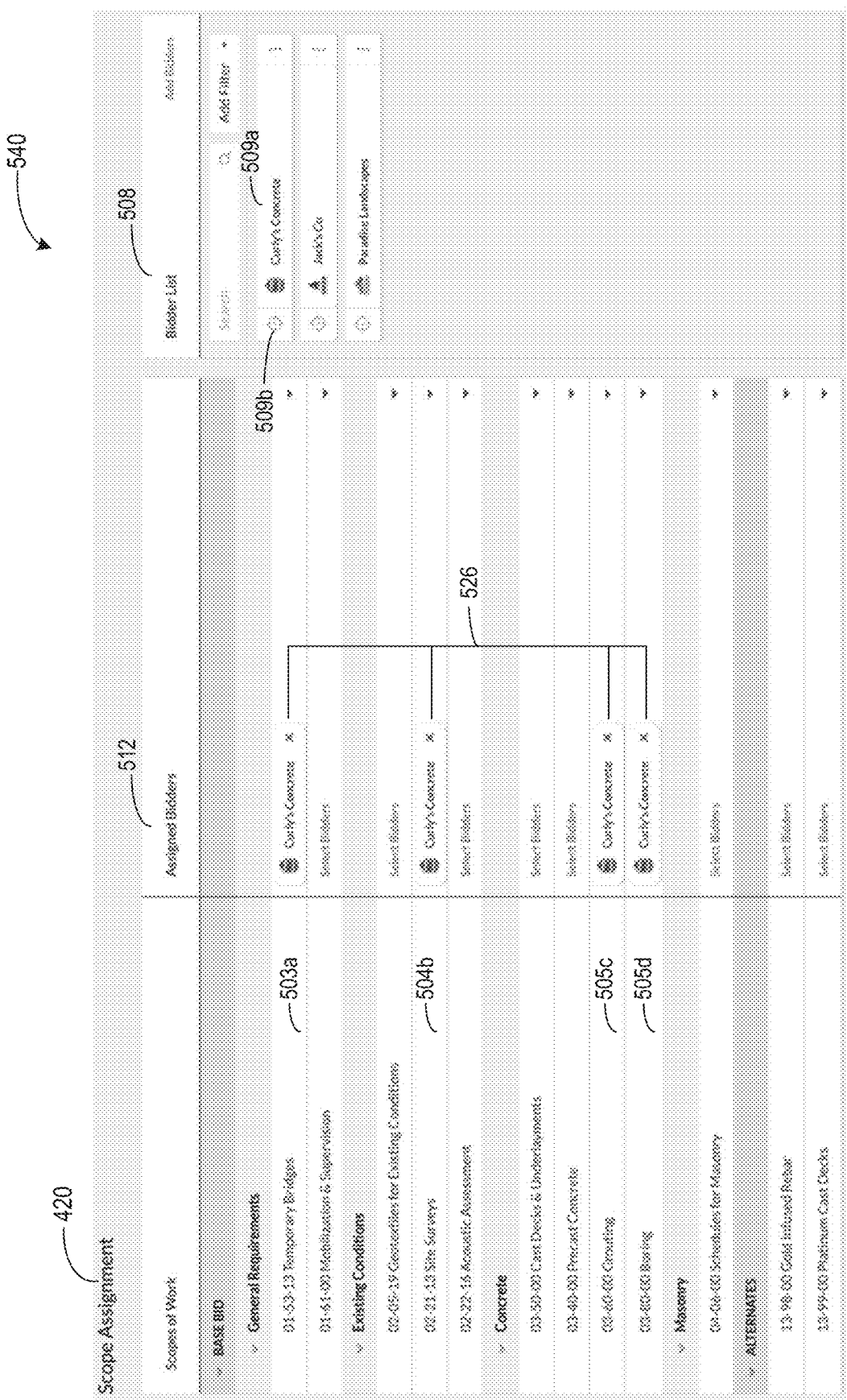
FIG. 5D depicts another example modified view of a GUI that may be presented to a user after performing bulk association using the disclosed software technology.

To illustrate, FIG. 5D depicts a modified view 540 that is shown after the construction professional has completed bulk association of the "Curly's Concrete" attribute value 509a and input a request to exit the bulk association mode as described above. As shown in view 540, the displays of target region 521 and the visual indication comprising highlighting the GUI button 509b have been discontinued. The visual indicator 526 corresponding to the "Curly's Concrete" attribute value 509a is displayed in the attribute display region 512 for each of line items 503a, 504b, 505c, and 505d, indicating that those line items have been associated with the "Curly's Concrete" attribute value 509a.

The disclosed bulk association tool may be used in the manner described above to bulk associate one or more of the line items with one or more additional values of the given attribute. Alternatively, or additionally, the disclosed technology may be used to bulk associate one or more of the line items with multiple attribute values of an attribute simultaneously. Examples of using the disclosed technology in these ways will now be described in more detail below.

After bulk associating the given attribute value of the given attribute with one or more line items as described above, the user may select a first additional attribute value of the given attribute with which to bulk associate one or more line items by selecting the respective visual representation of the first additional attribute value as described above.

The function of selecting the visual representation of the first additional attribute value may take various forms. As one possibility, the user may select the visual representation of the first additional attribute value by first inputting a request to close the target region and exit the bulk association mode with respect to the given attribute value and then selecting the visual representation of the first additional attribute value from the set of attribute values. After selecting the visual representation of the first additional attribute value, the user may then proceed to bulk associate one or more of the line items with the first additional attribute as described above. As another possibility, the user may select the visual representation of the first additional attribute value while the target region is still open (e.g. while the target region is still being displayed and the bulk association mode is still activated) with respect to the given attribute value. In this way, the GUI may allow the user to toggle between multiple attribute values while the target region is open and the bulk association mode is activated without needing to close the target region and exit the bulk association mode with respect to one attribute value and reactivate the bulk association mode with respect to another attribute value.

Figure 5E:
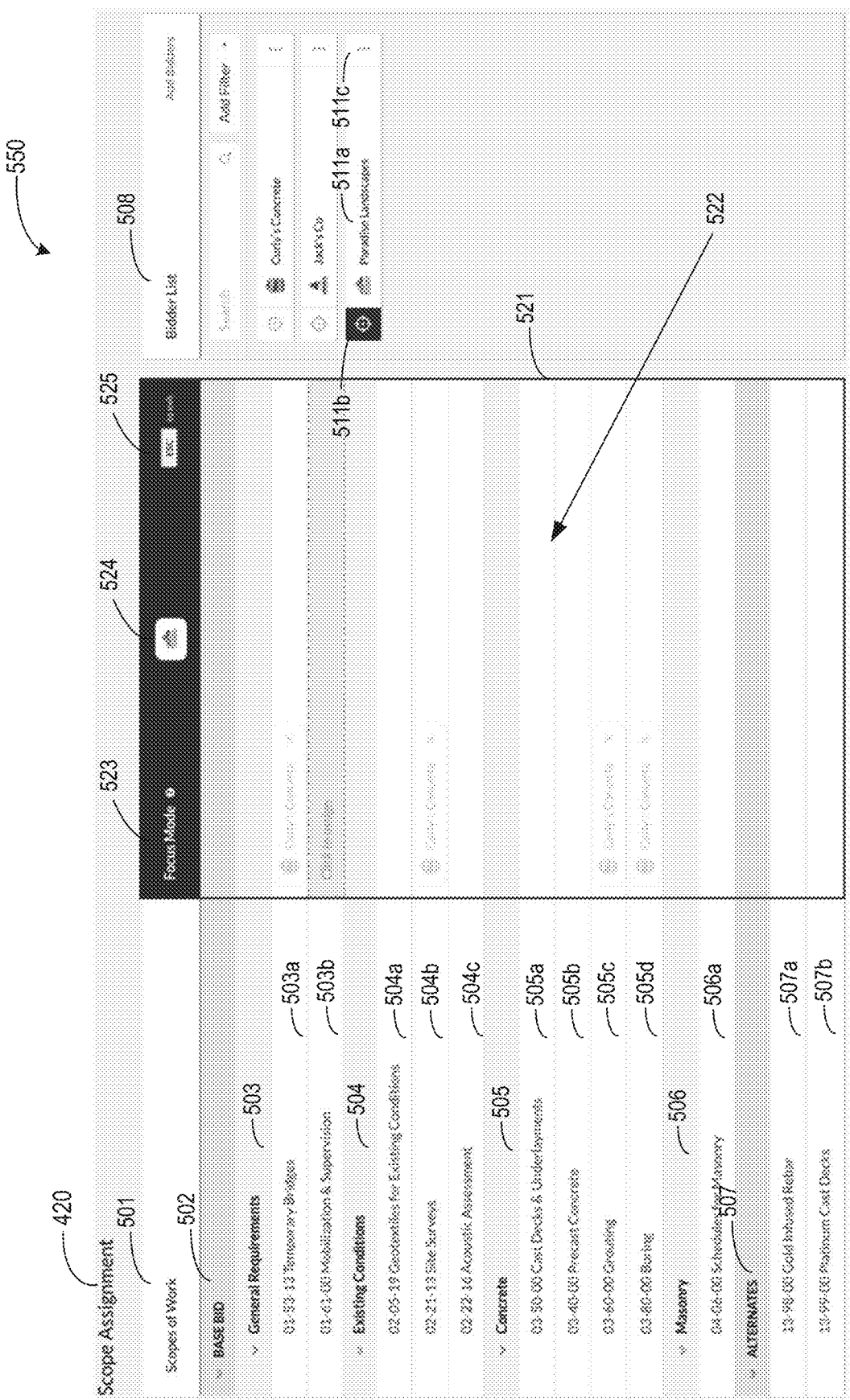
FIG. 5E depicts another example modified view of a GUI that may be presented to a user to facilitate bulk association using the disclosed software technology.

To illustrate, FIG. 5E depicts a modified view 550 of the view 540 in FIG. 5D, where, after completing bulk association of the line items with the "Curly's Concrete" attribute value 509a, the construction professional has selected a first additional attribute value, the "Paradise Landscape" attribute value 511a, with which to bulk associate one or more of line items 503a-507b. The construction professional may have selected the "Paradise Landscape" attribute value 511a for bulk association by selecting the visual representation of the "Paradise Landscape" attribute value 511a as described above with respect to FIGS. 5A-5B. Furthermore, the construction professional may have selected the "Paradise Landscape" attribute value 511a after bulk associating the "Curly's Concrete" attribute value 509a by either exiting the bulk association mode and then selecting the visual representation of the "Paradise Landscape" attribute value 511a or by toggling to the "Paradise Landscape" attribute value 511a while the bulk association mode was still activated and the target pane 521 was still open, as described above.

As shown in view 550, the construction professional may then be presented with an updated bulk association view with respect to the "Paradise Landscape" attribute value 511a. The bulk association view may be updated with respect to several aspects. In one aspect, the visual indication may be updated to highlight the GUI button 511b to indicate that the "Paradise Landscape" attribute value 511a is currently selected for bulk association. In another aspect, any visual indicators corresponding to attribute values other than presently-selected attribute value 511a that are displayed in attribute display region 512 may be grayed out. As shown, the visual indicator 526 corresponding with the "Curly's Concrete" attribute value 509a for each of line items 503a, 504b, 505c, and 505d has been grayed out. In yet another aspect, the visual indicator 524 in the target region 521 that serves to indicate which attribute value is currently selected for bulk association may be updated to correspond with the respective logo of the "Paradise Landscape" attribute value 511a. Additionally, although not shown, the cursor trailer may be updated to depict the respective logo of the "Paradise Landscape" attribute value 511a. The target region 521 may then enable the construction professional to select those of line items 503a-507b that should be bulk associated with the "Paradise Landscape" attribute value 511a, as described above with respect to FIGS. 5B and 5C.

Figure 5F:
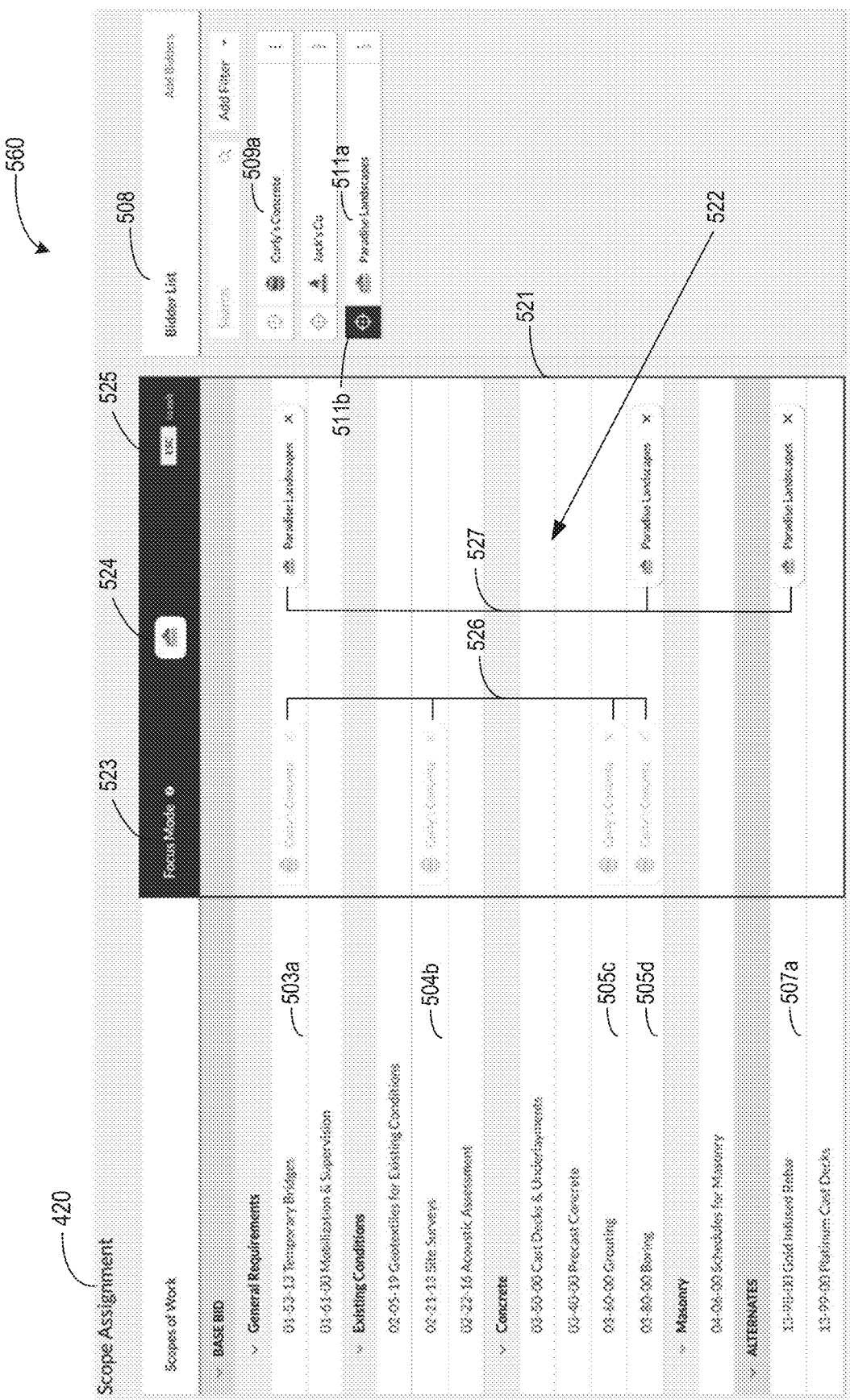
FIG. 5F depicts another example modified view of a GUI that may be presented to a user to facilitate bulk association using the disclosed software technology.

Turning to FIG. 5F, a modified view 560 of the view 550 is shown. In view 560, the construction professional has selected line items 503a, 505d, and 507a for bulk association with the "Paradise Landscape" attribute value 511a. Based on the construction professional's selections, for each of the selected line items 503a, 505d, and 507a, the view 560 may show, in the attribute display region 512 over which the target region 521 is overlaid, a visual indicator 527 corresponding with the "Paradise Landscape" attribute value 511a for each of the line items 503a, 505d, and 507a. The visual indicator 527 may include the name "Paradise Landscape" of attribute value 511a, the logo of the attribute value 511a, and a removal control element, denoted by an "X" icon, to disassociate the attribute value 511a from any of line items 503a, 505d, and 507a.

After completing the bulk association of line items 503a-507b with the "Paradise Landscape" attribute value 511a, the construction professional may input a request to close the target region 521 and exit the bulk association mode as described above with respect to FIGS. 5C and 5D (e.g., by selecting the ESC keyboard key as indicated by exit control element 525). Alternatively, the construction professional may toggle to a different attribute value to disassociate line items 503a, 504b, 505c, or 505d from with the attribute value 509a or to bulk associate line items 503a-507b with a second additional attribute value. The construction professional may toggle to a different attribute value by selecting the visual representation of the different attribute value while the target region 521 is open and the bulk association mode is activated, as described above.

Figure 5G:
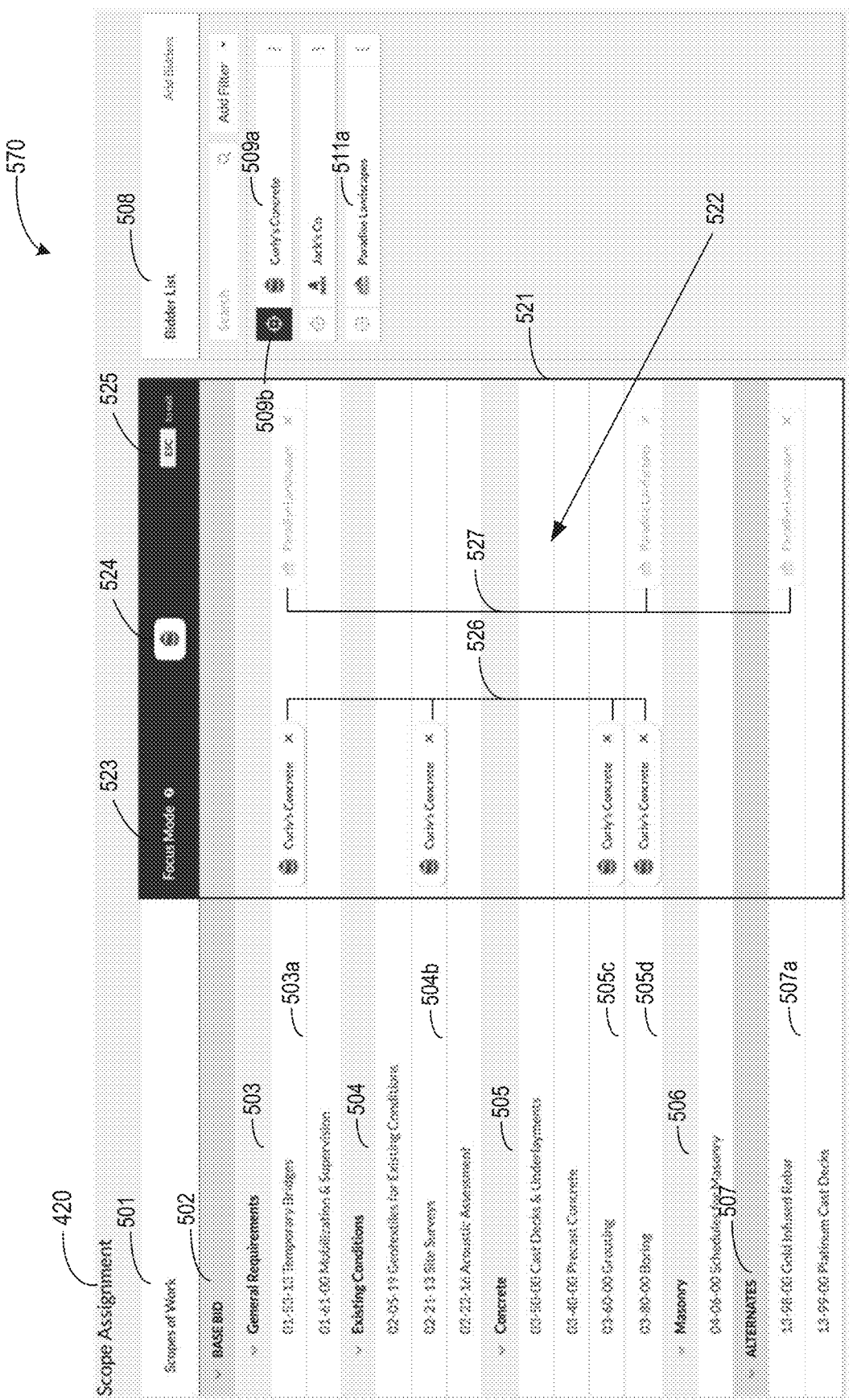
FIG. 5G depicts another example modified view of a GUI that may be presented to a user to facilitate bulk association using the disclosed software technology.

As one example, the construction professional may wish to disassociate the "Curly's Concrete" attribute value 509a from one or more of line items 503a, 504b, 505c, and 505d or associate the "Curly's Concrete" attribute value 509a with additional line items. Accordingly, while presented with the view 560, the construction professional may select the visual representation for the "Curly's Concrete" attribute value 509a as described above. In turn, the GUI may present a modified view 570 as shown in FIG. 5G, where (i) the visual indicator 526 corresponding with the "Curly's Concrete" attribute value 509a for each of line items 503a, 504b, 505c, and 505d has become selectable and the visual indicator 527 corresponding with the "Paradise Landscape" attribute value 511a for each of line items 503a, 505d, and 507a has been grayed out, (ii) the visual indicator 524 of the target region 521 has been updated with the logo for the "Curly's Concrete" attribute value 509a, (iii) and the visual indication that serves to indicate the attribute value that is currently selected for bulk association has been updated to highlight GUI button 509b. The construction professional may then proceed to disassociate one or more of line items 503a, 504b, 505c, and 505d from the "Curly's Concrete" attribute value 509a by selecting the removal control element of visual indicator 527. Additionally, or alternatively, the construction professional may proceed to bulk associate additional line items with the "Curly's Concrete" attribute value 509a as described above.

Figure 5H:
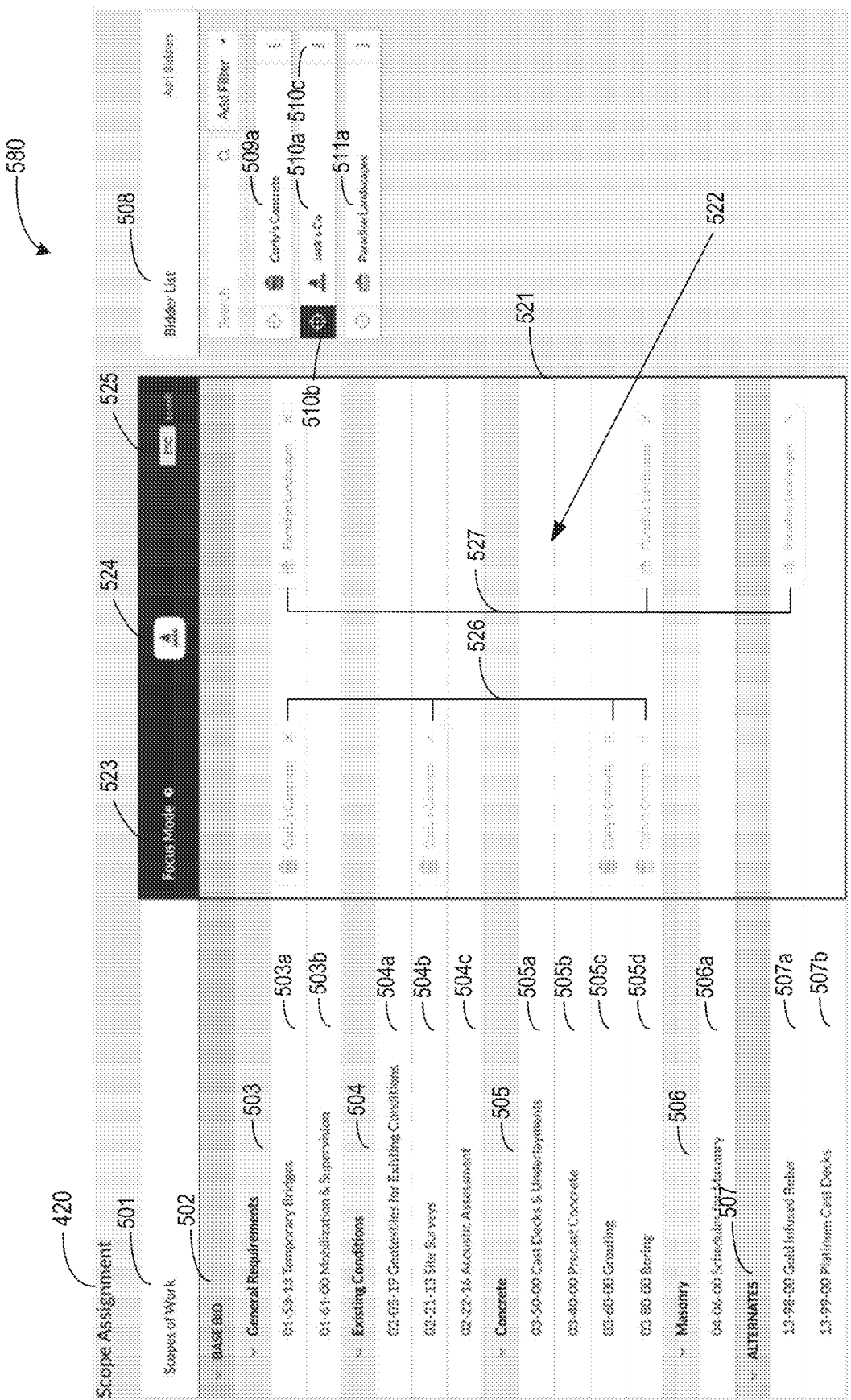
FIG. 5H depicts another example modified view of a GUI that may be presented to a user to facilitate bulk association using the disclosed software technology.

As another example, after completing the bulk association of line items 503a-507b with the "Paradise Landscape" attribute value 511a as described above, the construction professional may desire to associate a second additional attribute value with one or more of line items 503a-507b. Accordingly, while the target region 521 is open and the bulk association mode is activated, the construction professional may select the visual representation for the "Jack's Co" attribute value 510a. In turn, the GUI may present a modified view 580 as shown in FIG. 5H. FIG. 5H depicts a modified view 580 of the view 570 where the construction professional has selected the "Jack's Co" attribute value 510a for bulk association with one or more of line items 503a-507b. As shown, (i) the visual indicators 526 and 527 corresponding with the attribute values 509a and 511a, respectively, have been grayed out, (ii) the visual indicator 524 of the target region 521 has been updated with the logo for the "Jack's Co" attribute value 510a, (iii) and the visual indication that serves to indicate the attribute value that is currently selected for bulk association has been updated to highlight GUI button 510b. Additionally, although not shown, the cursor trailer may be updated to depict the logo associated with the "Jack's Co" attribute value 510a. The construction professional may then proceed to bulk associate line items 503a-507b with the "Jack's Co" attribute value 510a, as described above with respect to FIGS. 5B and 5C. For each line item that the construction professional select for bulk association with the "Jack's Co" attribute value 510a, the view 580 may show, in the attribute display region 512 over which the target region 521 is overlaid, a visual indicator corresponding with the "Jack's Co" attribute value 510a. This visual indicator may include the "Jack's Co" name of attribute value 510a, the logo of the attribute value 510a, and a removal control element, denoted by an "X" icon, to disassociate the attribute value 510a from any of the line items that have been associated with attribute value 510a. After completing the bulk association of line items 503a-507b with the "Jack's Co" attribute value 510a, the construction professional may toggle to a different attribute value or input a request to close the target region 521 and exit the bulk association mode, as described above.

In some embodiments, the disclosed bulk association tool may allow for selection of multiple attribute values of a given attribute to simultaneously bulk associate the multiple attribute values with one or more line items. The function of selecting multiple values for bulk association may take various forms. As one possibility, the user may select multiple attribute values by selecting the respective visual representation of each attribute value that the user wishes to simultaneously bulk associate with one or more line items. As another possibility, the user may select multiple attribute values using a combination of a keyboard and mouse (or trackpad) entry, such as by selecting a modifier key (e.g. the shift key) and then selecting the visual representation of each attribute value that the user wishes to simultaneously bulk associate with one or more line items. As yet another possibility, the user may select a separate option in the GUI view for enabling selection of multiple attribute values. Furthermore, the function of selecting multiple values for bulk association may be performed while the bulk association mode is currently activated, as described above with respect to FIGS. 5F-5H. The function of selecting multiple values for bulk association may take other forms as well.

Based on the user's selections of the multiple attribute values for bulk association, the GUI may present a bulk association view that enables the user to perform a bulk association of one or more of the line items with the multiple attribute values. For example, if the user has selected a first and a second value of a given attribute for bulk association, displaying the bulk association view may include displaying a target region overlaid over the attribute display region, graying out any visual indicators corresponding to attribute values other than the first and the second values that have been associated with the line items, and displaying a visual indication that both the first and the second attribute values have been simultaneously selected for bulk association (e.g., highlighting a respective GUI button for each of the first and the second attribute values). Furthermore, the visual indicator of the target region that serves to indicate the currently-selected attribute value for bulk association may be updated to include the respective logos of both the first and the second attribute values. Additionally, the cursor trailer may be updated to include the respective logos of both the first and the second attribute values.

The user may then proceed to select one or more line items for bulk association with the multiple attribute values as described above with respect to bulk associating a single attribute value. For each line item that is bulk associated with the multiple attribute values, the view may show, in the attribute display region over which the target region is overlaid, a respective visual indication for each of the multiple attribute values that may include the name, logo, and/or a removal control element for disassociating the respective attribute value from one or more of the line items.

Figure 5I:
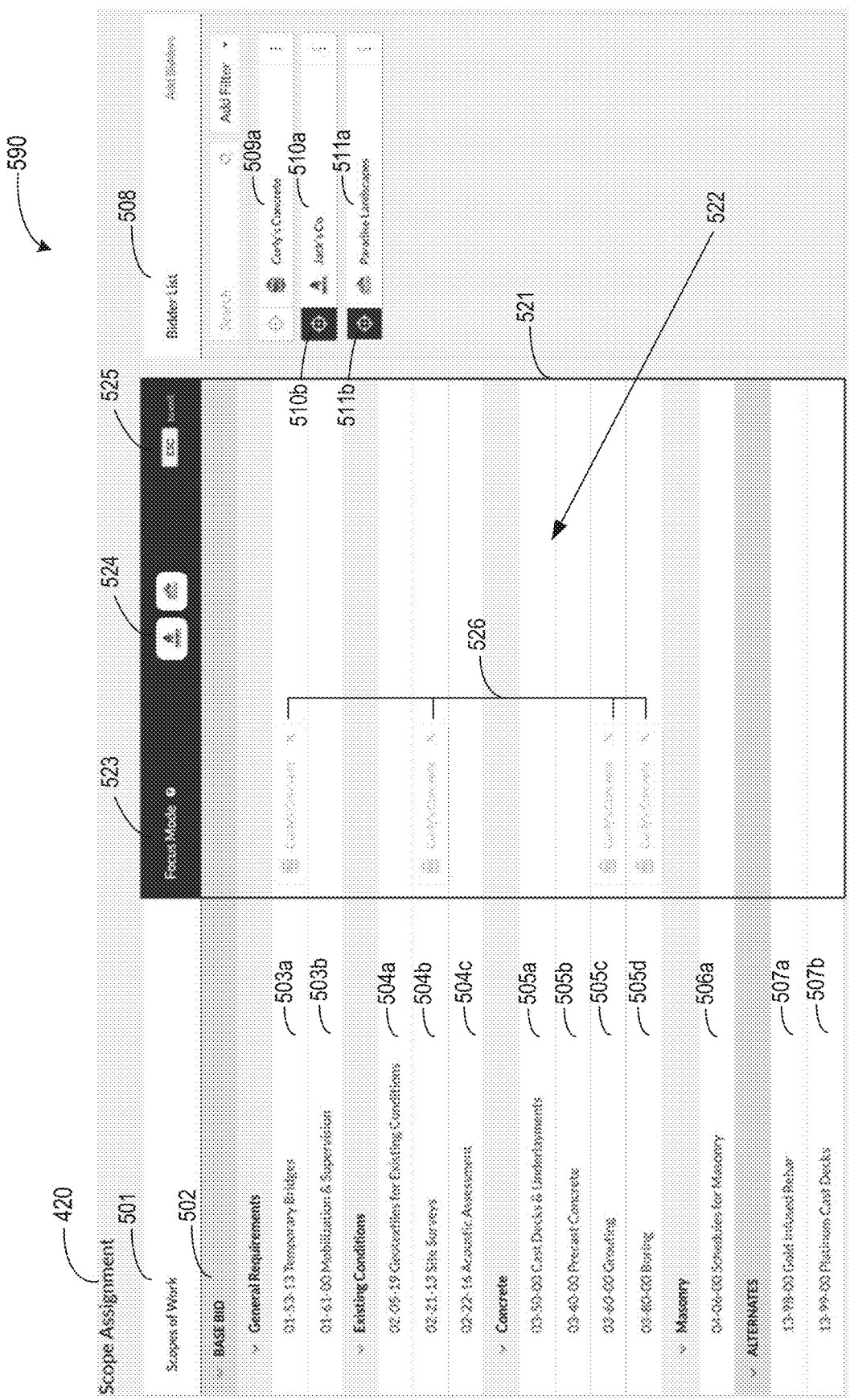
FIG. 5I depicts another example modified view of a GUI that may be presented to a user to facilitate bulk association using the disclosed software technology.

To illustrate, FIG. 5I depicts a modified view 590 of the view 540 shown in FIG. 5D. View 590 depicts a bulk association view presented to the construction professional upon selecting multiple attribute values for simultaneous bulk association with one or more of line items 503a-507b. After completing bulk association of the "Curly's Concrete" attribute value 509a with line items 503a, 504b, 505c, and 505d as described above with respect to FIGS. 5B-5D, the construction professional may have selected both of the attribute values "Jack's Co" 510a and "Paradise Landscapes" 511a for simultaneous bulk association, thereby being presented with the view 590 of FIG. 5I. As shown, (i) the visual indicator 526 corresponding with the attribute value 509a has been grayed out from the attribute display region 512 over which the target region 521 is overlaid, (ii) the visual indicator 524 of the target region 521 has been updated with the respective logos for each of the "Jack's Co" 510a and "Paradise Landscapes" 511a attribute values, (iii) and the visual indication that serves to indicate the attribute value that is currently selected for bulk association has been updated to highlight the respective GUI buttons 510b and 511b for each of the attribute values "Jack's Co" 510a and "Paradise Landscapes" 511a. Additionally, although not shown, the cursor trailer may also be updated to include the respective logos for each of the attribute values "Jack's Co" 510a and "Paradise Landscapes" 511a. The construction professional may then proceed to simultaneously bulk associate the attribute values "Jack's Co" 510a and "Paradise Landscapes" 511a, via a single user input, with one or more of the line items 503a-507b, as described above with respect to bulk associating a single attribute value. In turn, the view 590 may be updated to display, in the attribute display region 512, a respective visual indicator for each of the attribute values "Jack's Co" 510a and "Paradise Landscapes" 511a, which may include the respective name and logo of each respective attribute value 510a and 511a and a removal control element for disassociating one or both of the attribute values 510a and 511a from one or more of the line items 503a-507b with which they have been associated.

The disclosed bulk association tool may be used by a construction professional accessing the construction management software application in other ways as well. As one possibility, the construction professional may wish to record observations noted while making an on-site inspection of a given construction site for a given construction project. The disclosed bulk association tool may enable the construction professional to record such observations by bulk associating one or more observations with various aspects of the construction site. For example, after accessing the construction management application, the construction professional may navigate to a view displaying a list of data records (e.g., line items) that may be bulk associated with one or more observations. The construction professional may then proceed to activate the bulk association mode and bulk associate one or more of the given observation values as described above.

While the disclosed bulk association tool has been illustrated thus far in the context of a construction management software application, it should be noted, as mentioned above, the disclosed bulk association tool may be incorporated into any type of software application that lends itself to bulk association of data records with a selected value of an attribute. Some additional examples of how the disclosed bulk association tool may enable users of various types of software applications to make bulk associations are described below. It should be understood that these examples are merely illustrative, and the disclosed bulk association tool may be used in other ways and by other types of software applications as well.

As one additional example, the disclosed bulk association tool may be embodied in a software application for managing timesheets. The disclosed bulk association tool may then be used to bulk associate one or more attribute values with one or more timesheet entries. For example, a user of the software application may wish to add a given billing code value for one or more tasks included in timesheet entries for a group of employees. The user may navigate to a view displaying (i) the timesheets and/or timesheet entries of each employee in the group of employees requiring a timesheet edit and (ii) a set of billing code values that may be bulk associated with one or more of the timesheet entries. The disclosed bulk association tool may then be used to bulk associate the given billing code value with one or more timesheet entries. The disclosed bulk association tool may also be used to bulk associate additional billing code values with one or more timesheet entries. Furthermore, the disclosed bulk association tool may be used to bulk associate other attribute values with the timesheet entries as well.

As another additional example, the disclosed bulk association tool may be embodied in a software application for managing user directories. The disclosed bulk association tool may then be used to bulk associate one or more user attribute values with one or more users. For example, a user of the software application may wish to update permission information for one or more given employees in an employee directory. The user may navigate to a view displaying (i) a list of the given employees and (ii) a set of permission attribute values (e.g., "Permission Template," "Project Role," etc.) that may be bulk associated with one or more of the given employees. The disclosed bulk association tool may then be used to bulk associate one or more of the permission attribute values with one or more of the given employees. Furthermore, the disclosed bulk association tool may be used to bulk associate one or more of the given employees with other attribute values as well.

As yet another additional example, the disclosed bulk association tool may be embodied in a software application for managing invoices. The disclosed bulk association tool may be used to bulk associate one or more attribute values of one or more attributes with one or more given invoices. For example, a user of the software application may wish to update, for one or more invoices, (i) an invoice status and (ii) an assigned client. The user may navigate to a view displaying (i) a list of given invoices, (ii) a set of given invoice status attribute values (e.g., "Sent," "Paid," etc.) that may be bulk associated with one or more of the given invoices, and (iii) a set of given client attribute values that may be bulk associated with one or more of the given invoices. The disclosed bulk association tool may then be used to bulk associate one or more of the given invoices with one or more of the given invoice statuses and/or given clients as described above. Furthermore, the disclosed bulk association tool may be used to bulk associate the given invoices with other attribute values as well.

As still another additional example, the disclosed bulk association tool may be embodied in a software application for managing customer service requests. The disclosed bulk association tool may be used to bulk associate a given ticket status with one or more given customer service requests. For example, a user of the software application may wish to bulk associate a given ticket status (e.g., "Follow up with customer" or "Ticket resolved") with one or more given customer service requests. The user may navigate to a view displaying (i) a list of given ticket items corresponding to the given customer service requests and (ii) a set of ticket status values that may be bulk associated with one or more of the given ticket items. The disclosed bulk association tool may then be used to bulk associate one or more of the given status notes with one or more of the given ticket items as described above. Furthermore, the disclosed bulk association tool may be used to bulk associate the given ticket items with other attribute values as well.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

The invention claimed is:

1. A client station comprising:
    a user interface;
    at least one processor;
    at least one non-transitory computer-readable medium; and
    program instructions stored on the at least one non-transitory computer-readable medium that are executable by the at least one processor such that the client station is configured to:
        receive, via the user interface, a command to activate a bulk association mode for bulk associating a value with one or more data records;
        based on the command, cause the bulk association mode to be activated and thereby display, via the user interface, a user interface view that includes a target region for receiving an indication of one or more data records that are to be associated with one or more values;
        receive first user input selecting at least one given value that is to be bulk-associated with one or more data records;
        receive, within the target region, second user input indicating one or more given data records; and
        based on the second user input, cause each given data record to be associated with the at least one given value.

2. The client station of claim 1, further comprising program instructions stored on the at least one non-transitory computer-readable medium that are executable by the at least one processor such that the client station is configured to:
    before receiving the command to activate the bulk association mode, display, via the user interface, a user interface view that includes (i) a set of data records comprising the one or more data records and (ii) a set of values comprising the at least one given value.

3. The client station of claim 1, wherein the first user input selecting the at least one given value comprises the command to activate the bulk association mode.

4. The client station of claim 1, wherein the user interface view further comprises:
    for each given value, a respective visual indication that the given value has been selected for bulk association with the one or more given data records.

5. The client station of claim 1, wherein the target region comprises at least one visual border defining a selectable area that is configured to receive user input indicating each data record that is to be associated with the at least one given value.

6. The client station of claim 5, wherein the user input comprises one or more of: a mouse input, a trackpad input, a keyboard input, or a touch screen input.

7. The client station of claim 5, wherein the target region further comprises:
    a first visual indicator indicating that the bulk association mode is currently activated, the first visual indicator comprising either a textual label or an icon;
    for each given value, a respective second visual indicator indicating that the given value is currently selected for bulk association, the second visual indicator comprising an icon corresponding to the given value; and
    an option to exit the bulk association mode.

8. The client station of claim 1, wherein the program instructions that are executable by the at least one processor such that the client station is configured to receive the second user input comprise program instructions that are executable by the at least one processor such that the client station is configured to:
    receive a respective user input for each data record that is to be associated with the at least one given value.

9. The client station of claim 1, further comprising program instructions that are executable by the at least one processor such that the client station is configured to:
    receive a command to exit the bulk association mode; and
    based on the command to exit the bulk association mode, discontinue displaying the target region.

10. The client station of claim 1, further comprising program instructions that are executable by the at least one processor such that the client station is configured to:
    based on the second user input, display a respective visual representation of each given value corresponding to each given data record with which the given value is to be bulk-associated.

11. The client station of claim 10, wherein the respective visual representation of each given value comprises:
    a first visual indicator comprising a label describing the given value;
    a second visual indicator comprising an icon corresponding to the given value; and
    an option to disassociate the given value from the given data record.

12. The client station of claim 10, further comprising program instructions that are executable by the at least one processor such that the client station is configured to:
    receive a command to exit the bulk association mode; and
    based on the command to exit the bulk association mode:
        discontinue displaying the target region; and
        continue displaying the respective visual representations of each given value for each given data record with which the given value is to be bulk-associated.

13. The client station of claim 1, wherein the program instructions that are executable by the at least one processor such that the client station is configured to cause each given data record to be associated with the at least one given value comprise program instructions that are executable by the at least one processor such that the client station is configured to:
    cause data defining the data record to be updated to indicate a respective association with each given value.

14. The client station of claim 1, wherein each given value indicates a respective party that is to be assigned to a data record.

15. The client station of claim 1, wherein each given value indicates an action that is to be performed on a data record.

16. A non-transitory computer-readable medium, wherein the non-transitory computer-readable medium is provisioned with program instructions that, when executed by at least one processor, cause a client station to:
    receive, via a user interface of the client station, a command to activate a bulk association mode for bulk associating a value with one or more data records;
    based on the command, cause the bulk association mode to be activated and thereby display, via the user interface, a user interface view that includes a target region for receiving an indication of one or more data records that are to be associated with one or more values;
    receive first user input selecting at least one given value that is to be bulk-associated with one or more data records;

receive, within the target region, second user input indicating one or more given data records; and based on the second user input, cause each given data record to be associated with the at least one given value.

17. The non-transitory computer-readable medium of claim 16, wherein the non-transitory computer-readable medium is also provisioned with program instructions that, when executed by at least one processor, cause the client station to:

before receiving the command to activate the bulk association mode, display, via the user interface, a user interface view that includes (i) a set of data records comprising the one or more data records and (ii) a set of values comprising the at least one given value.

18. The non-transitory computer-readable medium of claim 16, wherein the first user input selecting the at least one given value comprises the command to activate the bulk association mode.

19. A method carried out by a client station, the method comprising:

receiving, via a user interface of the client station, a command to activate a bulk association mode for bulk associating a value with one or more data records;

based on the command, causing the bulk association mode to be activated and thereby displaying, via the user interface, a user interface view that includes a target region for receiving an indication of one or more data records that are to be associated with one or more values;

receiving first user input selecting at least one given value that is to be bulk-associated with one or more data records;

receiving, within the target region, second user input indicating one or more given data records; and based on the second user input, causing each given data record to be associated with the at least one given value.

20. The method of claim 19, further comprising:

before receiving the command to activate the bulk association mode, displaying, via the user interface, a user interface view that includes (i) a set of data records comprising the one or more data records and (ii) a set of values comprising the at least one given value.

\* \* \* \* \*